(12) United States Patent
Isabelle et al.

(10) Patent No.: US 11,867,499 B2
(45) Date of Patent: Jan. 9, 2024

(54) SYSTEM AND METHOD FOR VERIFYING A POSITION OF A COMPONENT ON AN OBJECT

(71) Applicant: FARO Technologies, Inc., Lake Mary, FL (US)

(72) Inventors: Maxime Thierry Isabelle, Montreal (CA); Benjamin Parkin, Marlborough, MA (US)

(73) Assignee: FARO Technologies, Inc., Lake Mary, FL (US)

( * ) Notice: Subject to any disclaimer, the term of this patent is extended or adjusted under 35 U.S.C. 154(b) by 283 days.

(21) Appl. No.: 17/147,913

(22) Filed: Jan. 13, 2021

(65) Prior Publication Data
US 2021/0254970 A1     Aug. 19, 2021

Related U.S. Application Data

(60) Provisional application No. 62/978,491, filed on Feb. 19, 2020.

(51) Int. Cl.
*G01B 11/25* (2006.01)
*G02B 27/09* (2006.01)

(52) U.S. Cl.
CPC ...... *G01B 11/2513* (2013.01); *G01B 11/2518* (2013.01); *G02B 27/0955* (2013.01)

(58) Field of Classification Search
CPC ... G01B 11/24; G01B 11/002; G01B 11/2433; G01B 11/00; G01B 11/25; G01B 11/04;
(Continued)

(56) References Cited

U.S. PATENT DOCUMENTS

| 4,891,529 A * | 1/1990 | Braun ................. G01B 11/00 250/559.19 |
| 6,233,005 B1 * | 5/2001 | Cornillault ............ E02F 3/847 348/94 |

(Continued)

FOREIGN PATENT DOCUMENTS

| CA | 2066613 A1 * | 4/1991 | |
| CA | 2865574 A1 * | 11/2013 | ............. B29C 70/30 |

(Continued)

OTHER PUBLICATIONS

Malnati, Peggy: "Machine vision: Rapid error detection", CompositesWorld Feb. 20, 2017, https://www.compositesworld.com/articles/machine-vision-rapid-error detection [retreived from internet on Feb. 20, 2020] pp. 1-6.

(Continued)

*Primary Examiner* — Michael P Stafira
(74) *Attorney, Agent, or Firm* — McCarter & English, LLP; Dave S. Christensen; David K. Kincaid

(57) ABSTRACT

An apparatus and method is provided for verifying the position of an edge of component on an object. The apparatus includes an optical sensor configured to receive light reflected from the component and the object. A contrast element disposed on or adjacent to the edge. One or more processors operably coupled to the optical sensor for determining the position of the edge at an inspection point. A system is also provided for cutting plies of a layup assembly and applying a contrast element to make the cut edge visible to position verification systems.

18 Claims, 20 Drawing Sheets

(58) Field of Classification Search
CPC ..... G01B 11/08; G01B 11/105; G01B 11/005; G01B 11/12; G01B 11/26; G01B 11/024; G01B 11/028; G01B 11/046; G01B 11/0608; G01B 11/14; G01B 11/22; G01B 11/2513; G01B 11/2518; G01B 11/2755; G01B 11/30; G01B 11/303; G01B 21/042; G01B 2210/283; G01B 2210/303; G01B 2290/15; G01B 9/02061; G01B 11/272; G01B 11/275; G01B 2210/143; G01B 2210/146; G01B 5/025; G01B 11/245; G01B 7/30; G01B 7/003; G01B 11/026; G01B 2210/56; G01B 21/20; G01B 11/2441; G01B 21/00; G01B 21/22; G01B 9/0209; G01B 11/16; G01B 7/004; G01B 11/06; G01B 11/306; G01B 21/24; G01B 5/02; G01B 11/2504; G01B 2210/50; G01B 7/02; G01B 7/06; G01B 11/02; G01B 11/0641; G01B 15/06; G01B 2210/14; G01B 2210/26; G01B 2210/30; G01B 5/14; G01B 5/30; G01B 7/023; G01B 9/02029; G01B 9/02057; G01B 9/02072; G01B 9/02075; G01B 9/02083; G01B 9/02084; G01B 13/22; G01B 21/04; G01B 21/047; G01B 21/32; G01B 3/205; G01B 5/0002; G01B 5/0025; G01B 5/06; G01B 5/285; G01B 7/28; G01B 9/0201; G01B 9/02091; G02B 5/124; G02B 5/128; G02B 5/12; G02B 5/136; G02B 5/122; G02B 30/56; G02B 30/60; G02B 27/0977; G02B 6/0038; G02B 27/0172; G02B 30/35; G02B 6/0078; G02B 1/10; G02B 2027/0134; G02B 2027/014; G02B 26/0816; G02B 27/0093; G02B 30/33; G02B 30/34; G02B 6/0018; G02B 6/0028; G02B 6/0048; G02B 6/0076; G02B 1/14; G02B 5/3025; G02B 5/305; G02B 1/04; G02B 1/11; G02B 1/113; G02B 17/045; G02B 19/0028; G02B 19/0042; G02B 27/60; G02B 3/0037; G02B 3/0056; G02B 5/08; G02B 5/126; G02B 5/13; G02B 5/287; G02B 6/004; G02B 6/0053; G02B 6/0068; G02B 6/0085; G02B 6/26; G02B 7/005; G02B 1/041; G02B 1/18; G02B 23/125; G02B 27/01; G02B 27/0101; G02B 27/017; G02B 27/0955; G02B 27/1066; G02B 27/14; G02B 27/50; G02B 3/00; G02B 30/50; G02B 5/0808; G02B 5/223; G02B 5/3083; G02B 6/00; G02B 6/0001; G02B 6/001; G02B 6/0015; G02B 6/0016; G02B 6/002; G02B 6/0036; G02B 6/005; G02B 6/0055; G02B 6/0056; G02B 6/0065; G02B 6/0096; G02B 6/105; G02B 6/262; G02B 6/426; G02B 7/08
See application file for complete search history.

(56) References Cited

U.S. PATENT DOCUMENTS

| | | | |
|---|---|---|---|
| 6,547,397 B1 | 4/2003 | Kaufman et al. | |
| 6,650,765 B1 * | 11/2003 | Alves | G08G 1/0175 |
| | | | 382/105 |
| 6,820,022 B2 | 11/2004 | Popp et al. | |
| 6,829,516 B2 | 12/2004 | Popp et al. | |
| 6,885,451 B2 | 4/2005 | Vogt et al. | |
| 6,935,748 B2 | 8/2005 | Kaufman et al. | |
| 6,979,629 B2 | 12/2005 | Yanagita et al. | |
| 7,123,981 B2 | 10/2006 | Dollevoet et al. | |
| 7,306,339 B2 | 12/2007 | Kaufman et al. | |
| 7,513,964 B2 | 4/2009 | Ritter et al. | |
| 8,085,388 B2 | 12/2011 | Kaufman et al. | |
| 8,463,006 B2 | 6/2013 | Prokoski | |
| 9,410,793 B2 | 8/2016 | Kaufman et al. | |
| 2004/0189944 A1 | 9/2004 | Kaufman et al. | |
| 2011/0085125 A1 | 4/2011 | Kimura et al. | |
| 2012/0154784 A1 | 6/2012 | Kaufman et al. | |
| 2014/0265042 A1 * | 9/2014 | Casale | B23K 26/352 |
| | | | 264/446 |
| 2015/0085108 A1 | 3/2015 | Kaufman et al. | |
| 2016/0077515 A1 * | 3/2016 | Pfeffer | G01B 11/2513 |
| | | | 700/160 |
| 2018/0063497 A1 | 3/2018 | Kaufman | |
| 2018/0209780 A1 * | 7/2018 | Schattenburg | G01B 11/002 |
| 2019/0064324 A1 | 2/2019 | Kaufman | |
| 2019/0391409 A1 * | 12/2019 | Savikovsky | H04N 9/3129 |

FOREIGN PATENT DOCUMENTS

| | | | | |
|---|---|---|---|---|
| CN | 105103668 A | * | 11/2015 | |
| CN | 106247931 A | * | 12/2016 | |
| CN | 108061516 A | * | 5/2018 | ............ G01B 11/00 |
| DE | 112005002690 T5 | * | 9/2007 | ......... G01B 11/2433 |
| DE | 202011100974 U1 | * | 9/2011 | ............ G01B 11/04 |
| DE | 112016001118 T5 | * | 3/2018 | ............... B23Q 7/00 |
| EP | 3524929 A1 | * | 8/2019 | ............ G01B 11/25 |
| GB | 2143423 A | * | 2/1985 | ............ A41H 43/00 |
| JP | 2019510658 A | | 4/2019 | |
| LU | 87682 A1 | * | 10/1991 | |
| WO | WO-2011056196 A1 | * | 5/2011 | ......... H04N 13/0425 |
| WO | WO-2019141317 A1 | * | 7/2019 | |
| WO | WO-2020003384 A1 | * | 1/2020 | |
| WO | WO-2020021098 A1 | * | 1/2020 | |

OTHER PUBLICATIONS

Sloan, Jeff: "Assembly Guidance real-time AFP inspection system" CompositesWorld Feb. 17, 2016, https://www.compositesworld.com/products/assembly-guidance-laser-based-real-time-inspection-system [retreived from internet on Feb. 20, 2020] pp. 1-3.

* cited by examiner

SYSTEM AND METHOD FOR VERIFYING A POSITION OF A COMPONENT ON AN OBJECT

CROSS REFERENCE TO RELATED APPLICATIONS

This application claims the benefit of U.S. Provisional Application Ser. No. 62/978,491, filed Feb. 19, 2020, the entire disclosure of which is incorporated herein by reference.

BACKGROUND

The subject matter disclosed herein relates to a system that can verify the position of a component in an assembly, and in particular to alight projection system that projects a glowing light pattern onto an object and verifies placement of a component in an assembly.

Light projection devices are used in a variety of applications to project images onto objects. In some applications, an illuminated three-dimensional (3D) pattern, also referred to as a "template," is projected onto an object. The template may be formed, for example, by projecting a rapidly moving, a light beam onto the object. In some systems, the projected light beam is a laser beam. The light beam strikes the surface of the object following a predetermined trajectory in a repetitive manner. When repetitively moved at a sufficiently high beam speed and refresh rate, the trace of the projected beam on the object appears to the human eye as a continuous glowing line. The projected pattern of light appears as the glowing template that can be used to assist in the positioning of parts, components and work pieces, such as plies or layers of sheet material in a layup process. In some cases, the projected template is based partly on computer aided design (CAD) data of the object.

Some light projection devices further include a sensor that is configured to detect light reflected off the surface of the object. This allows the light projection device to further detect features on the object (e.g. edges, corners) using techniques, such as by image analysis, photogrammetry, or time-of-flight measurement techniques for example. As a result, when a part, component, or work piece is placed on the object surface, in some instances, the placement of the part, component, or work piece may be verified by determining the position of features and comparing them with a CAD data.

A challenge faced in using light projection devices in verifying the positioning of some components, such as sheet material in a layup for example, is the low contrast between the ply or layer and the underlying surface. The low contrast may be due to the surface and the ply having the same normal direction, the same material, the same color, and the same reflectivity. As a result, the verification of the layer position is typically performed manually, usually by a supervisor or other highly trained personnel for example.

Accordingly, while existing light projection systems and methods of patterned light projection are suitable for their intended purposes, the need for improvement remains, particularly in providing a verification of the position of parts, components, or work pieces on an object surface.

BRIEF DESCRIPTION

According to one aspect of the disclosure, an apparatus for verifying the position of an edge of component on an object is provided. The apparatus includes an optical sensor configured to receive light reflected from the component and the object. A contrast element disposed on or adjacent to the edge. One or more processors operably coupled to the optical sensor for determining the position of the edge at an inspection point.

In addition to one or more of the features described herein, or as an alternative, further embodiments of the apparatus may include a light projector having a light source operable to emit a beam of outgoing light and a beam steering system operable to steer the beam of outgoing light onto the component and the object, wherein the light received by the optical sensor is light from the outgoing light returned from the component and the object. In addition to one or more of the features described herein, or as an alternative, further embodiments of the apparatus may include the optical sensor being integrated into the light projector. In addition to one or more of the features described herein, or as an alternative, further embodiments of the apparatus may include the contrast element being a reflective material disposed on the edge. In addition to one or more of the features described herein, or as an alternative, further embodiments of the apparatus may include the reflective material being a retroreflective material.

In addition to one or more of the features described herein, or as an alternative, further embodiments of the apparatus may include the contrast element being a reflective card positioned against the edge. In addition to one or more of the features described herein, or as an alternative, further embodiments of the apparatus may include the one or more processors are responsive for determining a deviation in the position of the edge. In addition to one or more of the features described herein, or as an alternative, further embodiments of the apparatus may include the deviation being based on comparing the determined position to an electronic model.

In addition to one or more of the features described herein, or as an alternative, further embodiments of the apparatus may include the one or more processors are further responsive for projecting a template of light onto the object prior to placement of the component. In addition to one or more of the features described herein, or as an alternative, further embodiments of the apparatus may include the component is a layer of material and the object is a layup assembly.

In addition to one or more of the features described herein, or as an alternative, further embodiments of the apparatus may include the one or more processors are further responsive to detect the presence of foreign object debris on the object or the component. In addition to one or more of the features described herein, or as an alternative, further embodiments of the apparatus may include the detection of the foreign object debris is based at least in part on an image acquired by the optical sensor.

In addition to one or more of the features described herein, or as an alternative, further embodiments of the apparatus may include the one or more processors are further responsive to detect the presence of foreign object debris on the object or the component based at least in part on the outgoing light returned from the component and the object.

According to yet another aspect of the disclosure, a method of verifying the position of a component on an object is provided. The method includes disposing a contrast element on or adjacent to an edge of the component. A returned light is received with an optical sensor. A position of the edge is determined based at least in part on the returned light.

In addition to one or more of the features described herein, or as an alternative, further embodiments of the method may include generating a template of light on the object with a light projector; positioning the component on the object based at least in part on the template of light; emitting a beam of outgoing light with the light source of a light projector; and steering the beam of outgoing light onto an object with the beam-steering system to define a scan box.

In addition to one or more of the features described herein, or as an alternative, further embodiments of the method may include the scan box being positioned on the edge, and the returned light is the beam of outgoing light reflected by the object or component. In addition to one or more of the features described herein, or as an alternative, further embodiments of the method may include determining a deviation between the determined position of the edge and a predetermined position of the edge. In addition to one or more of the features described herein, or as an alternative, further embodiments of the method may include the predetermined position being based at least in part on an electronic model of the object and component.

In addition to one or more of the features described herein, or as an alternative, further embodiments of the method may include the disposing of a contrast element includes applying a reflective material on the edge of the component. In addition to one or more of the features described herein, or as an alternative, further embodiments of the method may include the applying of the reflective material includes spraying, rolling, brushing, or rubbing of the reflective material onto the edge. In addition to one or more of the features described herein, or as an alternative, further embodiments of the method may include the reflective material is a retroreflective material.

In addition to one or more of the features described herein, or as an alternative, further embodiments of the method may include the disposing of a contrast element includes disposing a reflective card against the edge. In addition to one or more of the features described herein, or as an alternative, further embodiments of the method may include detecting the presence of foreign object debris on the object or the component. In addition to one or more of the features described herein, or as an alternative, further embodiments of the method may include the detecting of the foreign object debris is based at least in part on an image acquired by the optical sensor. In addition to one or more of the features described herein, or as an alternative, further embodiments of the method may include detecting the presence of foreign object debris on the object or the component based at least in part on the returned light.

According to yet another aspect of the disclosure, a system for verifying a position of a layer on a layup assembly is provided. The system includes a layer fabrication device having a movable arm and a cutter, the device configured to cut the layer to a predefined size and shape. A contrast element applicator is operably coupled to the arm, the contrast element applicator being configured to dispose a contrast element on an edge of the cut layer. A light projector having a light source is operable to emit a beam of outgoing light, a beam-steering system operable to steer the beam of outgoing light onto the component and the object, and an optical detector arranged to receive the light returned from the component and the object. One or more processors are operably coupled to the light projector for determining the position of the edge at an inspection point.

In addition to one or more of the features described herein, or as an alternative, further embodiments of the system may include the contrast element applicator being configured to dispose the contrast element simultaneously while the cutting of the layer. In addition to one or more of the features described herein, or as an alternative, further embodiments of the system may include the contrast element applicator disposing contrast element onto the edge by one of spraying, rolling, brushing, or rubbing. In addition to one or more of the features described herein, or as an alternative, further embodiments of the system may include the contrast element is a reflective material. In addition to one or more of the features described herein, or as an alternative, further embodiments of the system may include the reflective material is a retroreflective material.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Embodiments of the present invention provide verification of the positioning a light projector device.

Figure 1C:
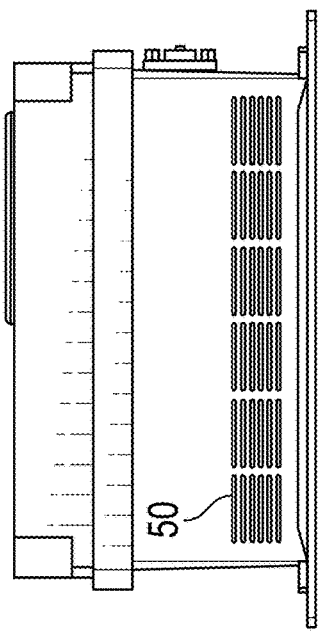
FIGS. 1A, 1B, 1C are perspective, front, and bottom views, respectively, of a light projector according to an embodiment.
Figure 1B:
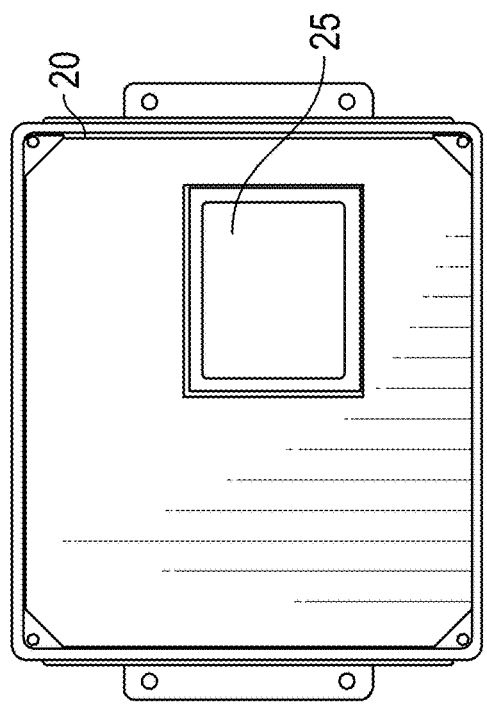
Figure 1A:
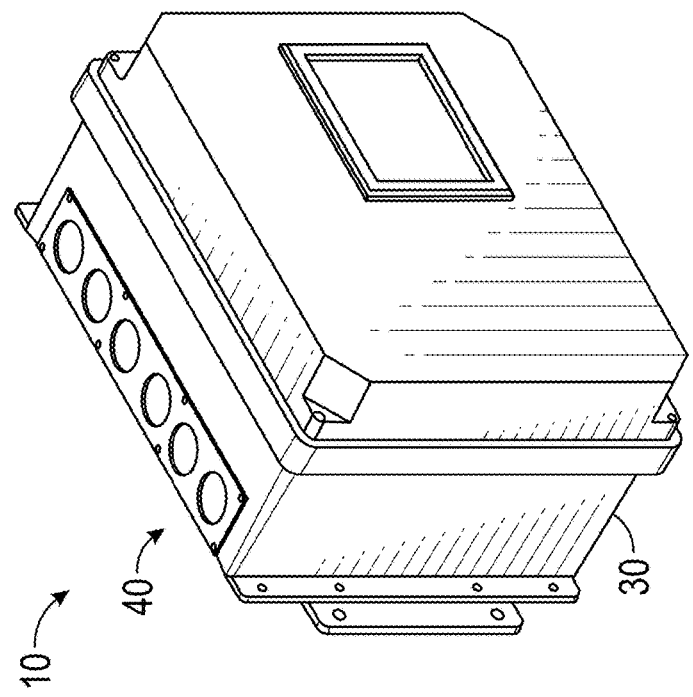
Figure 2A:
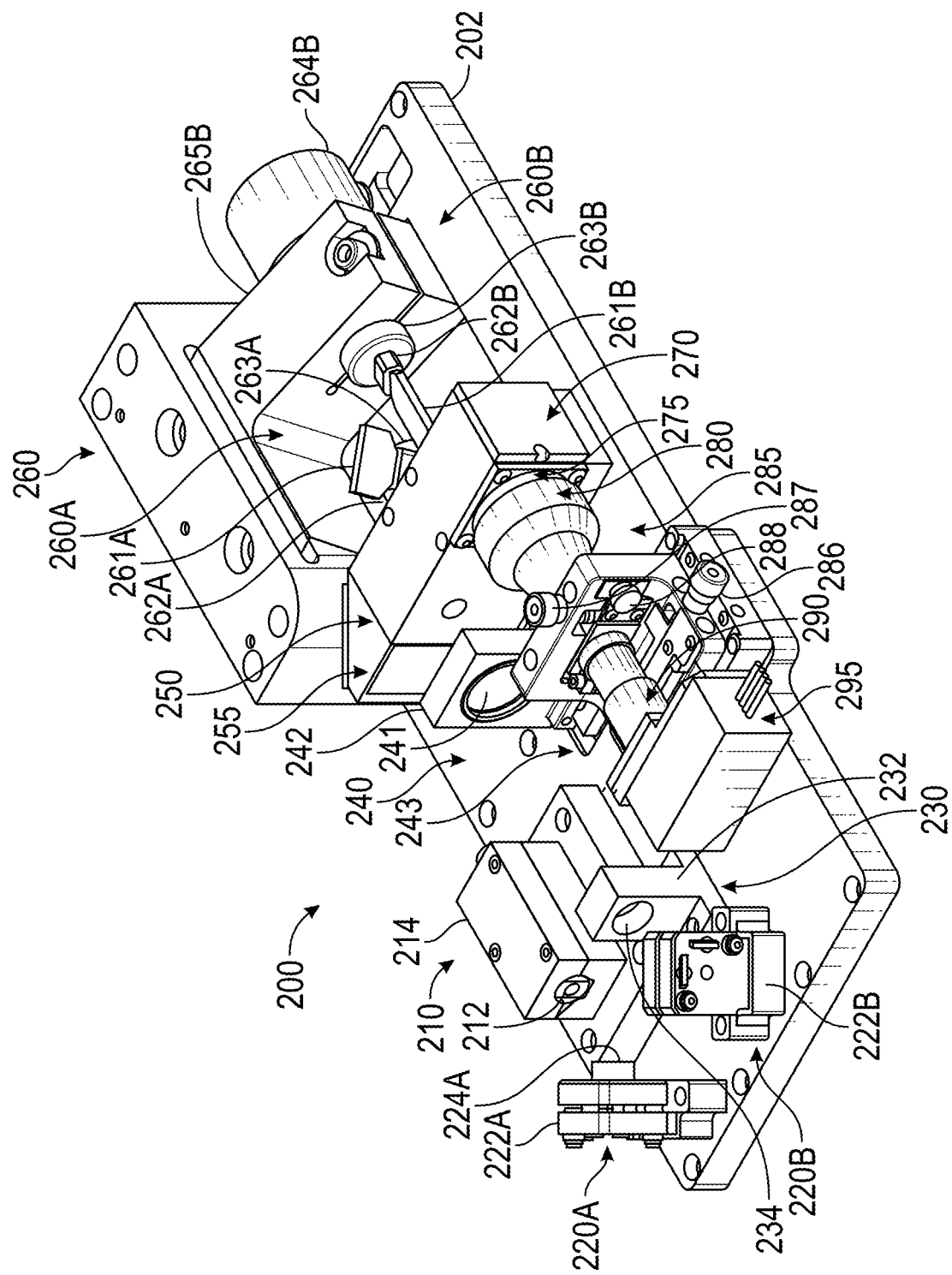
FIGS. 2A, 2B, 2C are perspective, top, and side views, respectively, of optical and electro-optical elements of the light projector according to an embodiment.
Figure 2B:
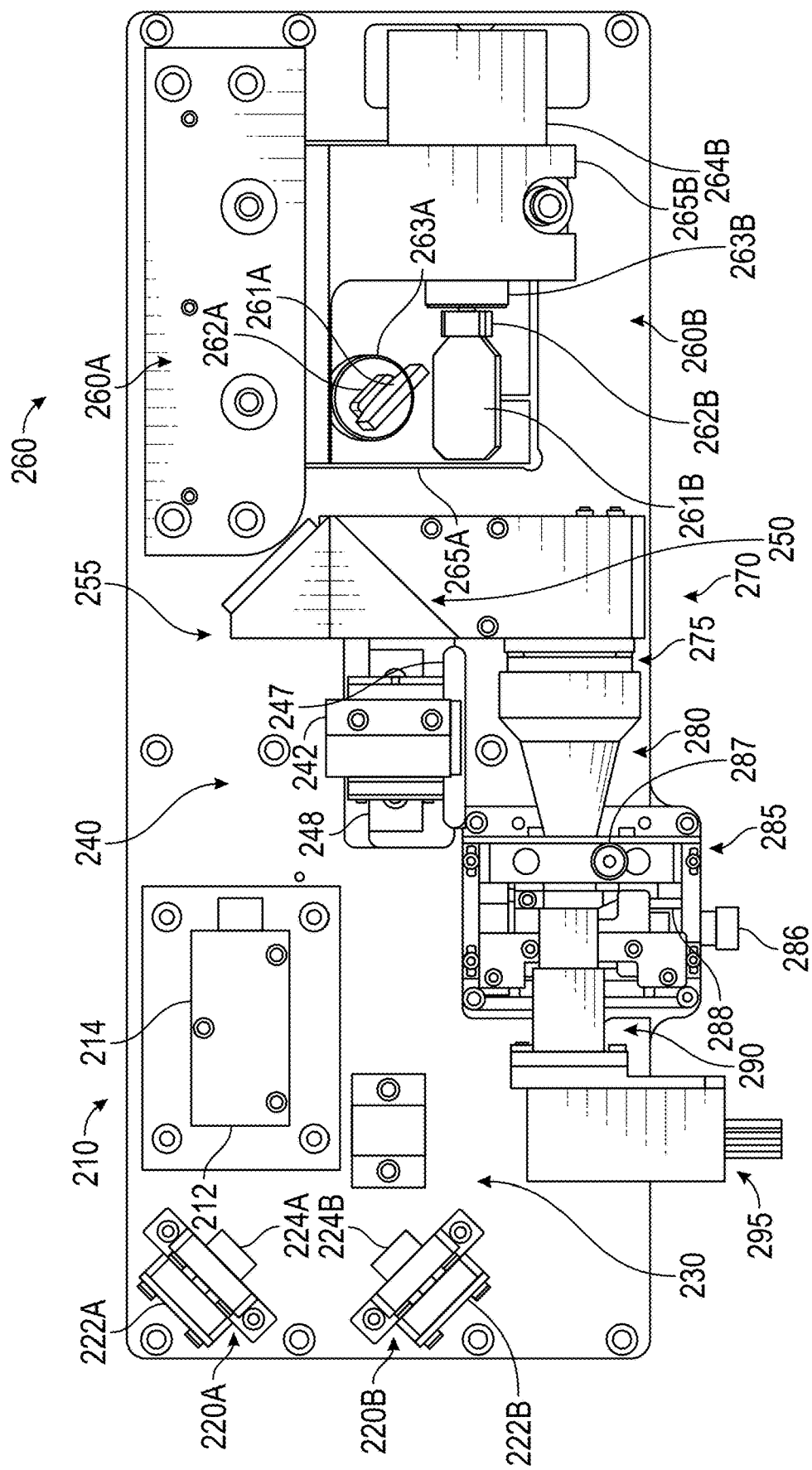
Figure 2C:
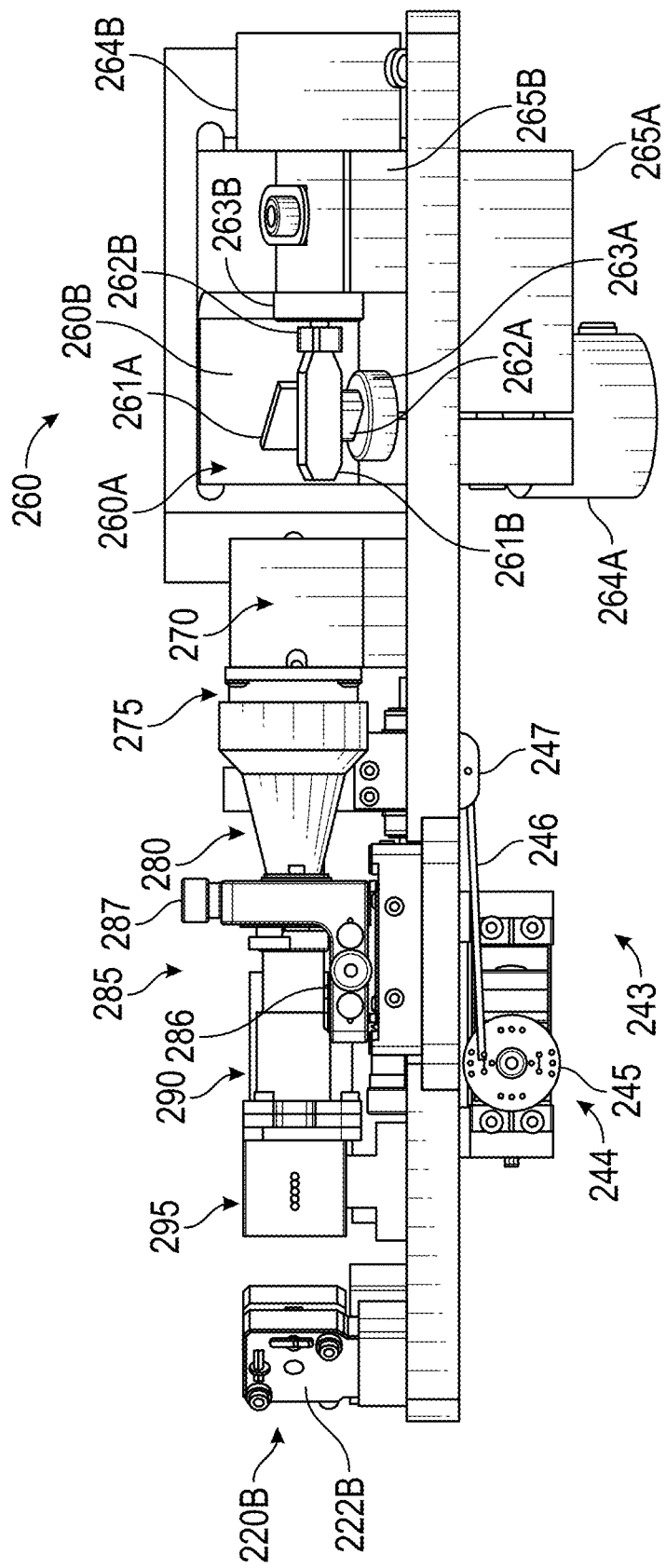
Figure 2D:
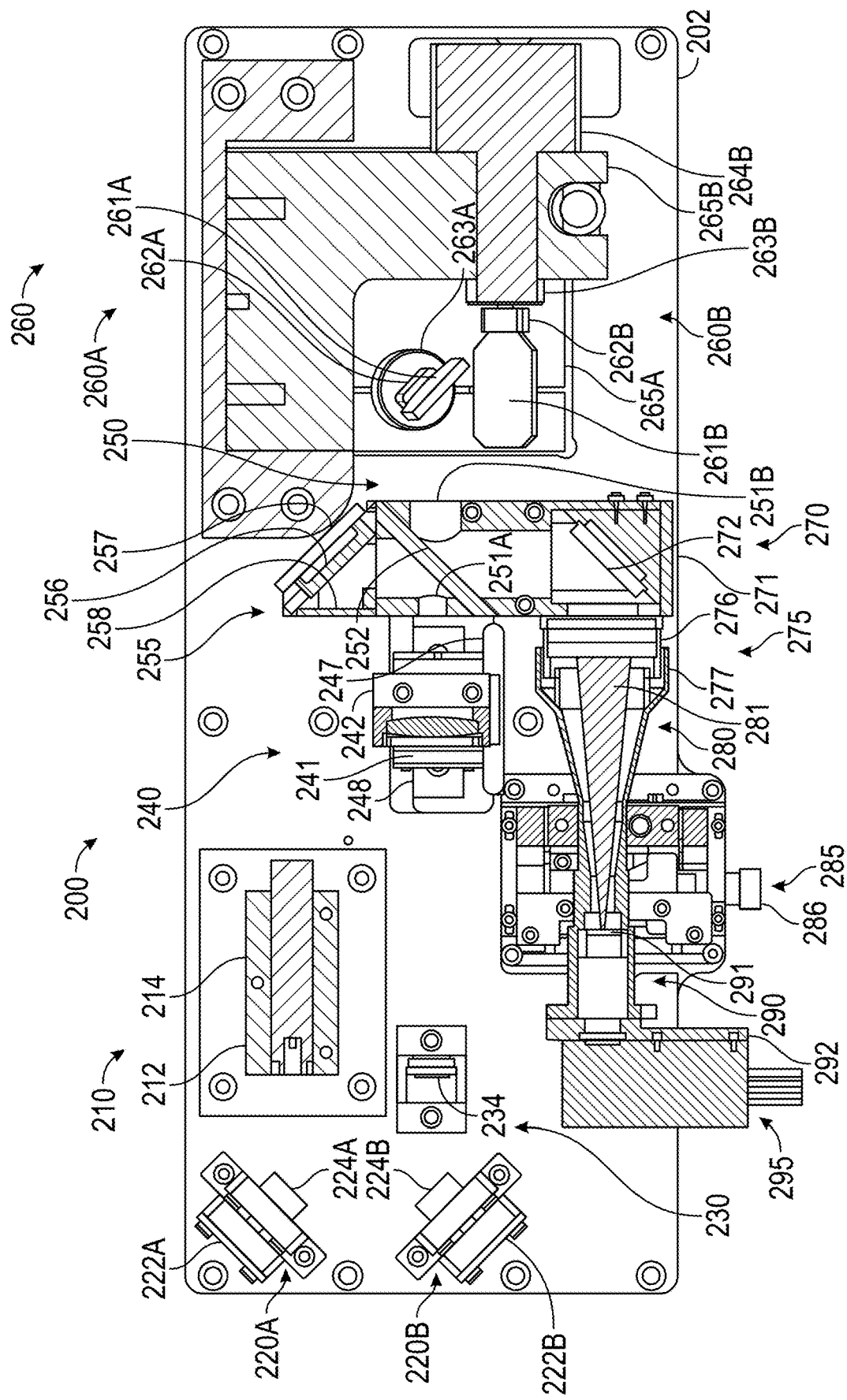
FIG. 2D is a cross-sectional view of an optical and electro-optical elements of the light projector according to an embodiment.

FIGS. 1A, 1B, 1C are perspective, front, and bottom views of a light projector 10 according to an embodiment. In an embodiment, the light projector 10 includes a front cover 20, a window 25, a base housing 30, a fan assembly 40, and venting slots 50. In an embodiment, a beam of light is sent out of and returned back through the window 25. In an embodiment, the light emitted by the light projector 10 is laser light.

FIGS. 2A, 2B, 2C, 2D are perspective, top, side, and cross-sectional views, respectively, of an electro-optical plate assembly 200 within the light projector 10. In an embodiment, the light projector 10 includes a mounting plate 202, a light source assembly 210, fold mirror assemblies, 220A, 220B, expanding lens assembly or beam expander 230, collimating/focusing lens assembly 240, beamsplitter assembly 250, two-axis beam-steering assembly 260, reflector mirror assembly 270, focusing lens assembly 275, In an embodiment, the light source assembly 210 includes a light source 212 and a mounting block 214. In an embodiment, the light source 212 is a diode-pumped solid state laser (DPSS) that emits a round beam of green laser light having a wavelength of about 532 nm. In other embodiments, the light source 212 is a different type of laser such as a diode laser or is a non-laser source. In an embodiment, the fold mirror assemblies 220A, 220B include fold mirrors 224A, 224B, respectively, and adjustable mirror mounts 222A, 222B, respectively. In an embodiment, light from the light source reflects off the fold mirrors 224A, 224B and then travels through a beam expander 230, which includes a beam expander lens 234 and a beam expander mount 232. The expanded beam of light from the beam expander 230 travels through a collimating/focusing lens assembly 240, which acts to focus the beam leaving the light projector 10 onto an object of interest. Because the light leaving the light projector 10 is relatively far from the light projector 10, the beam of light is nearly collimated and converges relatively slowly to a focused spot. In an embodiment, the collimating/focusing lens assembly 240 includes a lens 241, a lens mount 242, and a motorized focusing stage 243. The motorized focusing stage 243 adjusts the position of the lens 241 and lens mount 242 to focus the beam of light onto the object of interest. In an embodiment, the motorized focusing stage 243 includes a servomotor assembly 244 that drives a rotary actuator 245 attached to shaft 246 affixed to an attachment 247. As the rotary actuator 245 rotates, it causes the lens mount 242 to be translated on a ball slide 248.

In an embodiment, the beamsplitter assembly 250 includes entrance aperture 251A, exit aperture 251B, and beamsplitter 252. In an embodiment, the beamsplitter 252 is a 50/50 beamsplitter, which is to say that the beamsplitter 252 transmits half and reflects half the incident optical power. Half of the light arriving at the beamsplitter assembly 250 from the collimating/focusing lens assembly 240 is reflected onto a beam absorber assembly 255, which absorbs almost all the light, thereby keeping unwanted reflected light from passing back into the electro-optical plate assembly 200. In an embodiment, the beam absorber assembly 255 includes a neutral density filter 256, a felt absorber 257, and a felt absorber 258.

Figure 4:
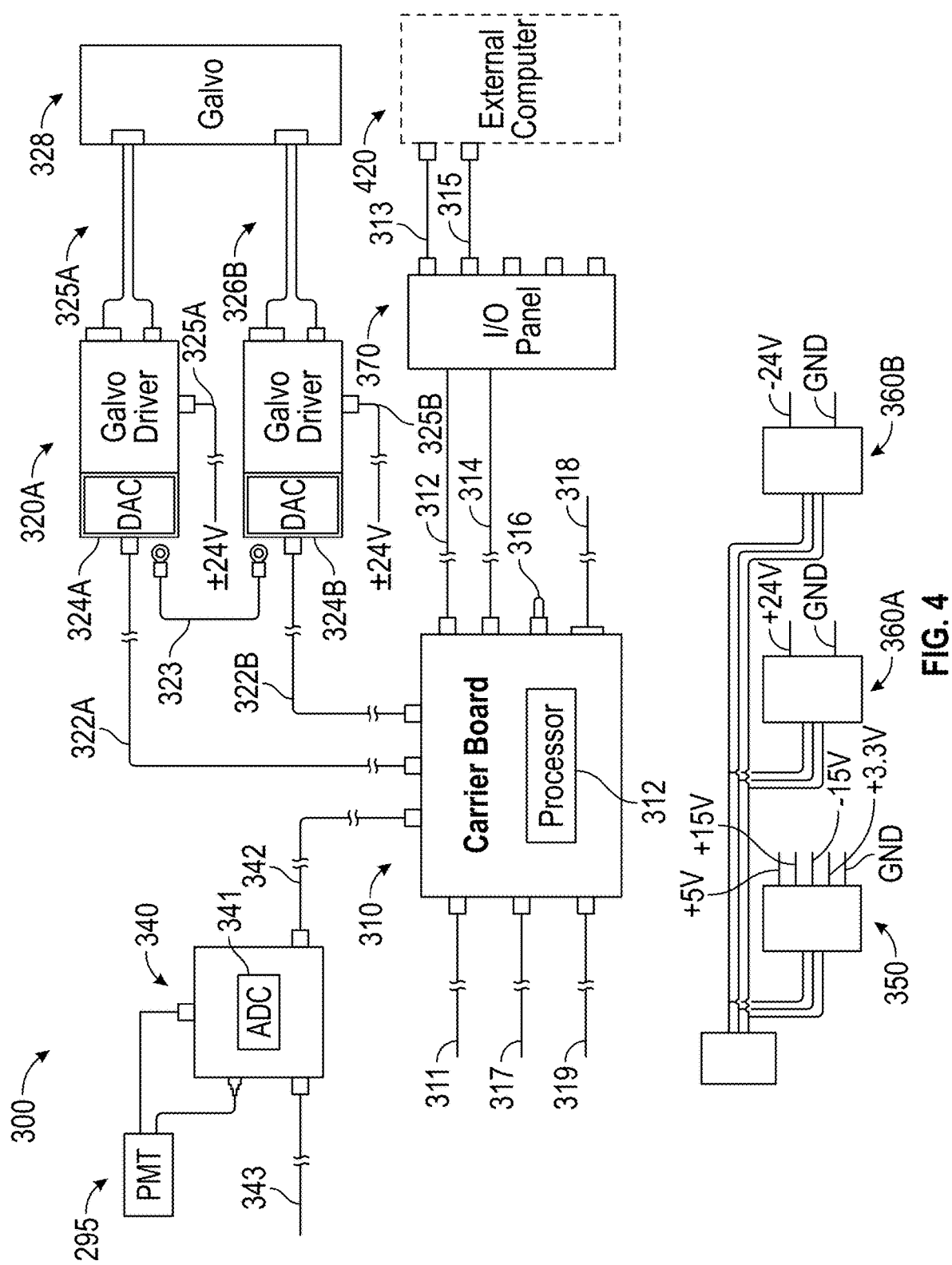
FIG. 4 is an electrical block diagram of the light projector according to an embodiment.

The two-axis beam-steering assembly 260 includes beam steering assemblies 260A, 260B. Each beam steering assembly 260A, 260B includes respectively a light weight mirror 261A, 261B, a mirror mount 262A, 262B, a motor 263A, 263B, a position detector 264A, 264B, and a mounting block 265A, 265B. The first mirror 261A steers the beam of light to the second mirror 261B, which steers the beam out of the window 25 to the object of interest. The two-axis beam-steering assembly 260 steers the beam in each of two orthogonal axes, sometimes referred to as x-y axes. In an embodiment, the two-axis beam-steering assembly 260 is provided steering directions to move the beam of light in a predetermined pattern by a processor 312 (FIG. 4). Light reflected or scattered off the object of interest retraces the outgoing path, striking first the mirror 261B and then the mirror 261A before passing through the exit aperture 251B, and reflecting off the beamsplitter 252. Beam steering assemblies such as 260A, 260B are also each referred to as galvanometers or galvos, which is an electromechanical device that works as an actuator that produces a rotary deflection, in this case of the mirrors 261A, 261B.

The reflector mirror assembly 270 includes mount 271 and return mirror 272. The focusing lens assembly 275 includes focusing lens 276 and lens mount 277. In an embodiment, light arriving at the return mirror 272 from the beamsplitter 252 passes through the focusing lens 276. In an embodiment, the focusing lens 276 is a doublet. In an embodiment, an opaque cone 280 smoothly slides over lens mount 277 and attaches rigidly to adjustment stage 285. The purpose of the opaque cone 280 is to block background light from within the light projector 10 from contaminating the light emitted by the light source assembly 210 and reflected off the object of interest and passing through the focusing lens 276. Aperture assembly includes aperture 291 and aperture mount 292. In an embodiment, the aperture assembly 290 is rigidly affixed to the optical detector assembly 295 by an interface element 292. In an embodiment, the aperture assembly 290 is further rigidly coupled to the adjustment stage 285. The adjustment stage 285 is adjusted in the x direction by an x adjuster 286, in they direction by a y adjuster 287, and in the z direction by a z adjuster 288. The purpose of the adjustment stage 285 is to adjust the position of the aperture 291 and the optical detector assembly 295 in x, y, and z relative to the beam of light to enable the focused light beam 281 to pass through the aperture for the object of interest located within the rated range of distances of the object being scanned with the light from the light projector 10. The purpose of the aperture is to block unwanted background light, especially light scattered from within the enclosure of the light projector 10, for example, off the mirrors 216A, 216B, the beamsplitter 252, the components of the beam absorber assembly 255, the return mirror 272, and the focusing lens 276. In addition, the aperture 291 helps to block unwanted background light from the environment outside the enclosure of the light projector 10. Examples of such unwanted background light blocked by the aperture include artificial light and sunlight, both direct and reflected.

In an embodiment, the aperture 291 is a circular aperture. In an embodiment, the circular aperture has a diameter of 150 micrometers and a centering accuracy of +/−20 micrometers. A circular aperture is often referred to as a pinhole, and the element 291 may alternatively be referred to as an aperture or a pinhole. In other embodiments, the aperture is not circular but has another shape.

The optical detector assembly 295 receives light on an optical detector within the optical detector assembly 295 and produces an electrical signal in response. In an embodiment, the optical detector is a photomultiplier tube (PMT). In an embodiment, the PMT is includes a high-voltage supply circuit and a low-noise amplifier. In an embodiment, the amplifier is connected close to the PMT anode output pin to reduce the effect of external noise on the produced electrical signal. In an embodiment, the PMT is a Hamamatsu H11903 photosensor manufactured by Hamamatsu Photonics K.K., with headquarters in Shimokanzo, Japan. An advantage of a PMT for the present application includes high sensitivity to small optical powers and ability to measure both very weak optical signals and very strong optical signals. In an embodiment, the gain of the PMT can be adjusted by a factor of 100,000 or more according to the selected gain level, which is determined by the voltage applied to the PMT. This wide range of achievable gains enables the light projector to measure object regions ranging from dark black to bright white or shiny (i.e. highly reflective).

Figure 5A:
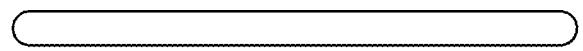
FIG. 5A, FIG. 5B and FIG. 5C are illustrations showing three different line widths obtained an object in a procedure for adjusting focusing of the light emitted by the light projector on an object according to an embodiment.
Figure 5B:
Figure 5C:
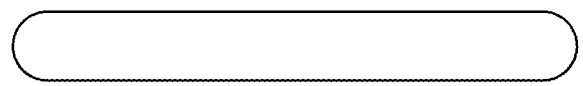
Figure 6A:
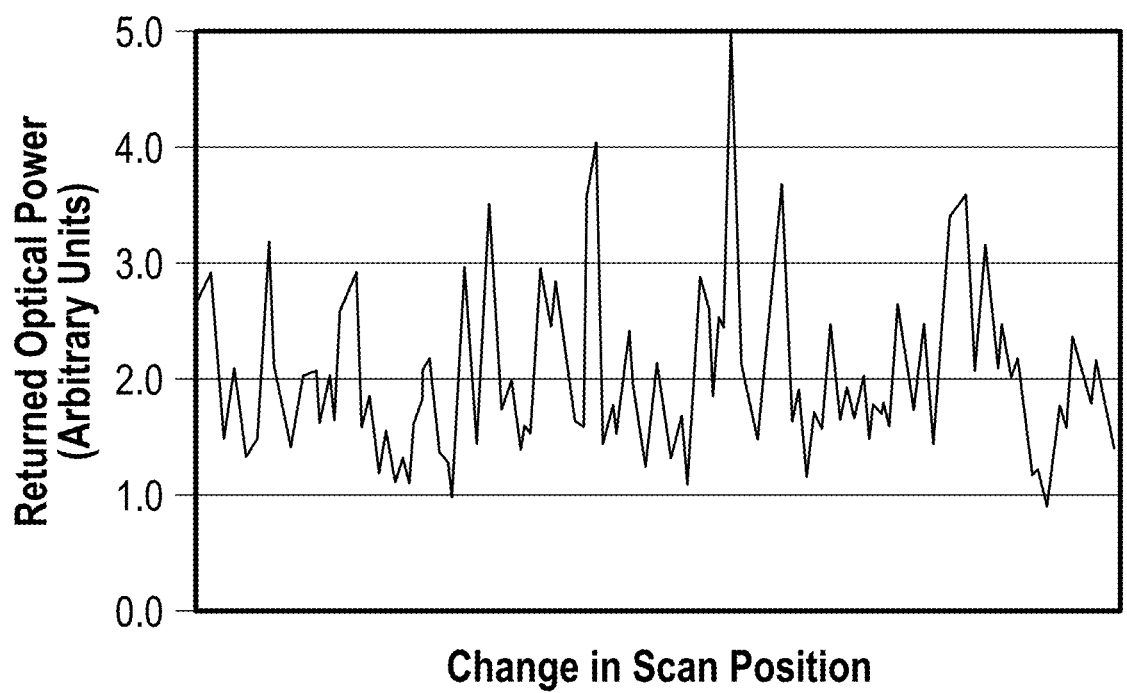
FIG. 6A, FIG. 6B and FIG. 6C are plots showing relative optical power returned as a function of scanning position for the three focusing conditions of FIG. 5A, FIG. 5B and FIG. 5C according to an embodiment.
Figure 6B:
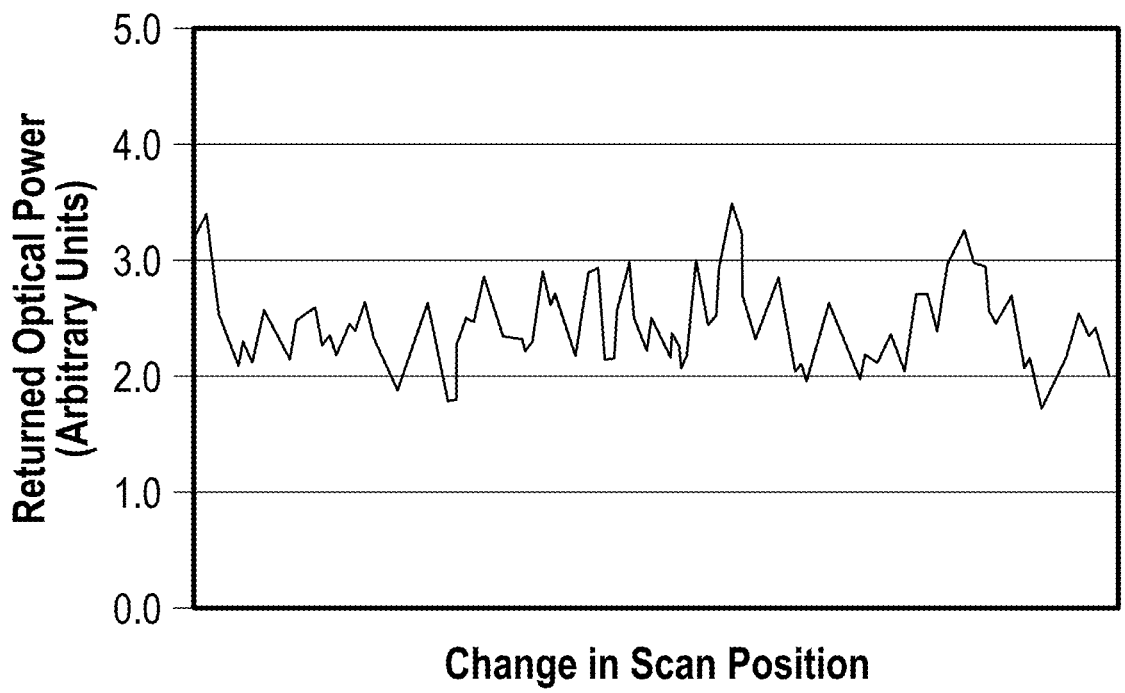
Figure 6C:
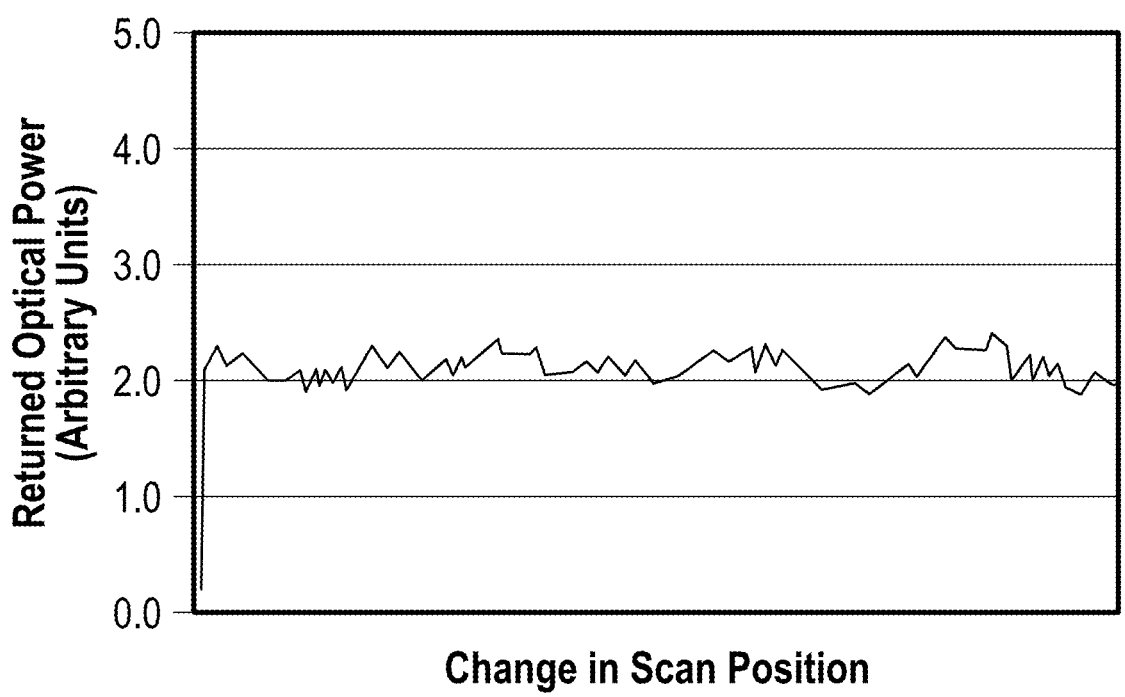

As explained herein above, the motorized focusing stage 243 adjusts the position of the lens 241 and lens mount 242 to focus the beam of light from the light projector 10 onto the object of interest. A method for determining the correct focusing position for the motorized focusing stage 243 is now described with reference to FIG. 5A, FIG. 5B, and FIG. 5C and FIG. 6A, FIG. 6B, and FIG. 6C. In an embodiment, the motorized focusing stage 243 adjusts the position of the collimating/focusing lens assembly 240 to each of several positions, thereby producing scanning lines of different widths as illustrated in FIG. 5A, FIG. 5B, and FIG. 5C. FIG. 5A shows the case in which the scanning line is adjusted to its minimum width, while FIG. 5B and FIG. 5C illustrate wider out-of-focus scanner lines produced by focusing of the lens 241 by the motorized focusing stage 243. In an embodiment, the desired focusing of the collimating/focusing lens assembly 240 is found by stepping the lens 241 to each of several positions. At each of those positions, the galvo mirrors 261A, 261B are used to steer the projected light along a line. An example is shown in FIG. 6A, FIG. 6B, and FIG. 6C, where the observed relative optical powers observed for each correspond to the levels of focus illustrated in FIG. 5A, FIG. 5B, and FIG. 5C, respectively. As can be seen in FIG. 5A-FIG. 5C and FIG. 6A-FIG. 6C, improved focus corresponds to relatively larger variations in the returned optical power as received by the optical detector assembly 295 as the beam is steered from point to point on the object of interest. Note that the average level of optical power in each of FIG. 6A, FIG. 6B, and FIG. 6C is the same, namely about 2.0 arbitrary units (au), in each of FIG. 6A, FIG. 6B, and FIG. 6C. In contrast, the peak relative optical power observed in FIG. 6A in around 5.0 au, around 3.0 au higher than the average value, while the peak relative optical power observed in FIG. 6C is only around 2.5 au, which is only around 0.5 au higher than the average relative optical power. Without being bound to a particular theory, it is believed the reason for this change in relative optical power level is speckle, which is an effect in which laser light scattered off different portions of an object interfere constructively or destructively to produce the fluctuations in returned optical power. When a laser beam is focused, the relative change in the returned optical power is increased as the beam is swept along the object. In an embodiment, the motorized focusing stage 243 is adjusted until the maximum change in relative optical power is achieved in scanning a line. This ensures that the lens 241 has been adjusted to the position of optimal focus.

In an embodiment, a pre-scan is performed to determine the desired level of gain for a given scan region. For example, if a region is scanned with some elements in the region having a relatively high reflectance, for example because the elements are white, the gain of the PMT is set to a relatively low value since the optical power returned to the PMT is relatively high. On the other hand, if scanning is performed on a region containing only elements having relatively low reflectance, for example because the elements are black or dark, the gain of the PMT is set to a relatively high value. In an embodiment, a pre-scan is performed on a region to be measured as a way to obtain relatively high measurement sensitivity without saturating the PMT. In other words, the use of a pre-scan enables relatively dark objects to be measured even at relatively large distances from the light projector 10. When a region includes both white or light objects as well as black or dark objects, in an embodiment, the region may be broken into sub-regions, with separate scans performed for at least some of the sub-regions.

The light from the light source 212 that leaves the light projector 10 travels to the object of interest and scatters off the object in a solid angle, afterwards retracing its path as it returns to the light projector 10. After reflecting off the mirrors 261B, 261A, the solid angle of returning scattered light is limited in size by the exit aperture 251B. The light then reflects off beamsplitter 252 before passing through the focusing lens 276 to form the focused light beam 281. The direction of focused light beam 281 is determined by the path from a first point at which light from the light projector 10 strikes the object to a second point through the center of the entrance pupil of the focusing lens 276. In an embodiment, the aperture 291 is further aligned to the path that extends from the first point to the second point and into the optical detector assembly 295. Furthermore, in an embodiment, the position of the aperture 291 as adjusted in the z direction to cause the beam waist of the returning beam of light to pass through the aperture 291 when the object is in the range of 5 to 7 meters from the light projector 10. In an embodiment, the aperture 291 is large enough to pass nearly all of the return light through the exit aperture 251B onto the active area of the optical detector at the range of 5 to 7 meters. In an embodiment, the light begins to clip slightly at larger distances such as 10 to 15 meters from the light projector 10. At distances closer to the light projector 10 than 5 meters, the light will clip more significantly, but this is not usually a problem because the optical power scattered off an object point closer than 5 meters has larger scattered intensity than light scattered off an object point farther from the light projector 10.

In an embodiment, the aperture 291 is rigidly affixed to the aperture assembly 290, which in turn is rigidly affixed to the optical detector assembly 295. In an embodiment, the optical detector assembly 295 and aperture assembly 290 are further aligned to ensure that returning light passing through the center of the entrance pupil of the focusing lens 276 not only passes through the center of aperture 291 but also the center of the active area of the optical detector in the optical detector assembly 295. As a result, the range of operation of the light projector 10 is made as large as possible. This is to say that the rigid attachment of the aperture 291 to the optical detector assembly 295 in combination with alignment of the aperture 291, the optical detector assembly 295, the focusing lens 276, and the exit aperture 251B helps to ensure that the best sensitivity is obtained for objects both near to and far from the light projector 10. With this alignment, the pre-scan is also expected to give consistent results in determining the PMT gain settings required for each combination of object distance and object reflectance.

Figure 3:
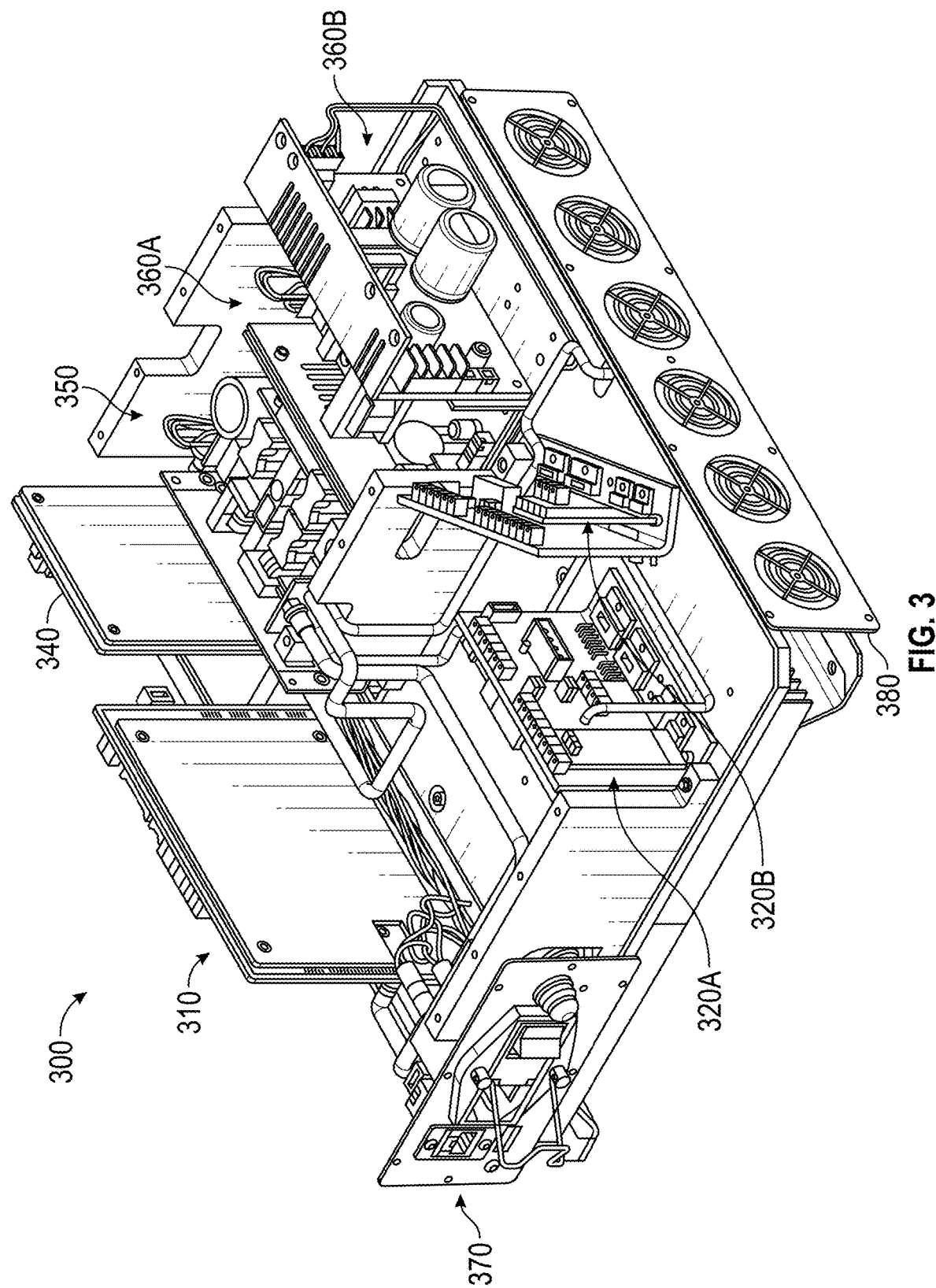
FIG. 3 is an isometric view of electrical components within the light projector according to an embodiment.

FIG. 3 is a perspective view of the electrical assembly 300 within the light projector 10, and FIG. 4 is an electrical block diagram for the light projector 10. The electrical assembly 300 includes an electronics plate 302 and a number of circuit boards including a carrier board 310, first galvo driver 320A, second galvo driver 320B, analog circuit board 340, multi-voltage power supply 350, +24 volt power supply 360A, and −24 volt power supply 360B. The circuit block diagram representation for the electrical assembly 300 is shown in FIG. 4. The carrier board 310 includes a processor 312 that controls many functions within the light projector 10. Control cables 322A, 322B run from the carrier board 310 to digital-to-analog converters (DACs) 324A, 324B on the first and second galvo driver boards 320A, 320B, respectively. Control signals sent from the carrier board 310 to the DACs 324A, 324B control the angles of the mirrors 261A, 261B, thereby controlling the direction to which the beam is steered. Power supplies 360A, 360B supply +24 volts, −24 volts, respectively, to the galvo drivers 320A, 320B, which in turn supply voltages to the galvo motor/position-sensing components 328 through cables 326A, 326B. In an embodiment, a jumper cable is used to connect the first and second galvo driver boards 320A, 320B when synchronized steering is needed in two dimensions (such as X and Y directions).

The analog circuit board 340 includes an analog-to-digital converter (ADC) 341. The ADC 341 receives an analog electrical signals from the optical detector assembly 295, which in an embodiment is a PMT. The ADC 341 converts the analog signals into digital electrical signals, which it sends over an Ethernet cable 342 to the carrier board 310. The carrier board provides the digital data to the processor 312 and, in an embodiment, to an external computer 420 attached to input/output (I/O) panel 370 through a USB cables 313, an Ethernet cable 315, and/or a wireless channel. In an embodiment, the processor 312 or external computer 420 constructs a gray-scale image of the optical powers received by optical detector assembly 295. Such an image may be displayed to a user, may be used to identify features in the scanned object, and may be used for other functions such as setting the position of the lens 241 with the motorized focusing stage 243. In an embodiment, the analog circuit board 340 receives voltages over the cable 343 from the multi-voltage power supply 350. In an embodiment, the carrier board 310 further provides control signals to the motorized focusing stage 243 over the cable 317 and control signals to the light source 212 over the cable 318. A connector 316 is attached to the circuit board to override the laser bypass circuit. In an embodiment, the carrier board 310 is further provided with a cable 319 operable to send a signal to reset the software on the carrier board. The carrier board 310 receives voltages over the cable 311 from the multi-voltage power supply 350. In an embodiment, additional voltages are provided from the multi-voltage power supply 350 to the I/O panel 370 and to the fan assembly 380.

In an embodiment, the light projector 10 may be configured to measure the distance from the light projector 10 to the object based at least in part on the time of flight of the beam of light being emitted from the light source 212, reflected off of the object back to the optical sensor. Since the angles of the mirrors 261B, 261A is known, the three-dimensional (3D) coordinates of a point on the object may be determined in a projector frame of reference. As will be discussed in more detail below, the ability measure the location on the object may allow for the verification of a placement of a part, component, or work piece may be determined.

It should be appreciated that while embodiments herein may describe the light projector 10 in reference to FIGS. 1-4, this is for example purposes and the claims should not be so limited. In other embodiments the light projector may be that described in commonly owned U.S. Pat. Nos. 7,372,558, 9,410,793, 9,423,278, 6,547,397, 6,935,748, 7,306,339, and 8,085,388, the contents of all of which are incorporated by reference herein.

Figure 7:
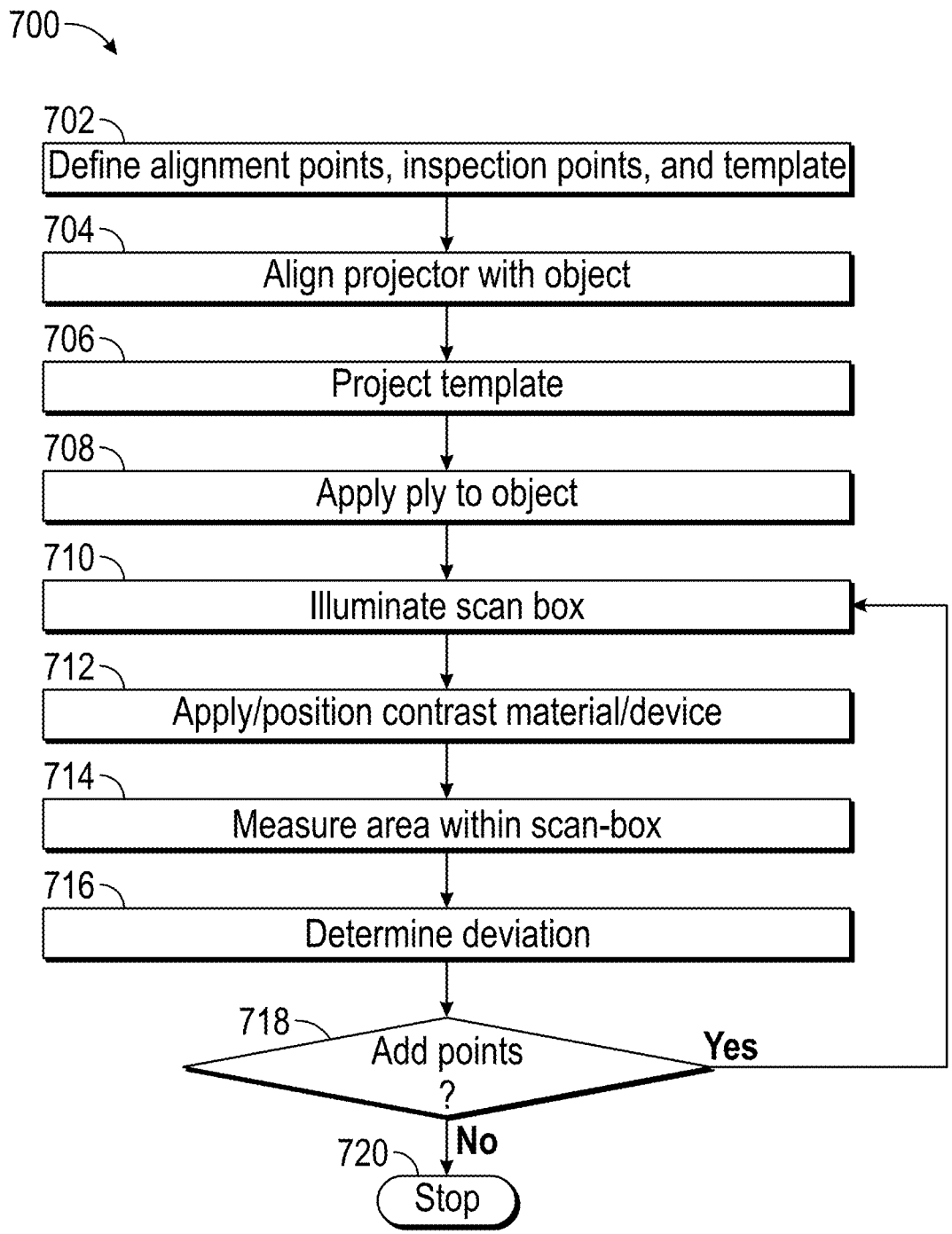
FIG. 7 is a flow diagram of a method of validating a placement of a layer in a layup assembly according to an embodiment.

Referring now to FIG. 7, an embodiment is shown of a method 700 for verifying the position of a component, such as a ply in a layup assembly for example. As used herein, the phrase "layup assembly" means an object that is fabricated by stacking layers of material to form a desired shape. The layers of materials typically have embedded resin/thermoplastic, or have resin/thermoplastic applied, that is subsequently cured to form the desired object. The material used in the layers may be a composite material, such as carbon fiber for example, or a fiberglass for example. This process is used for form objects found in the aerospace, marine, automobile, and storage tank applications.

Figure 8A:
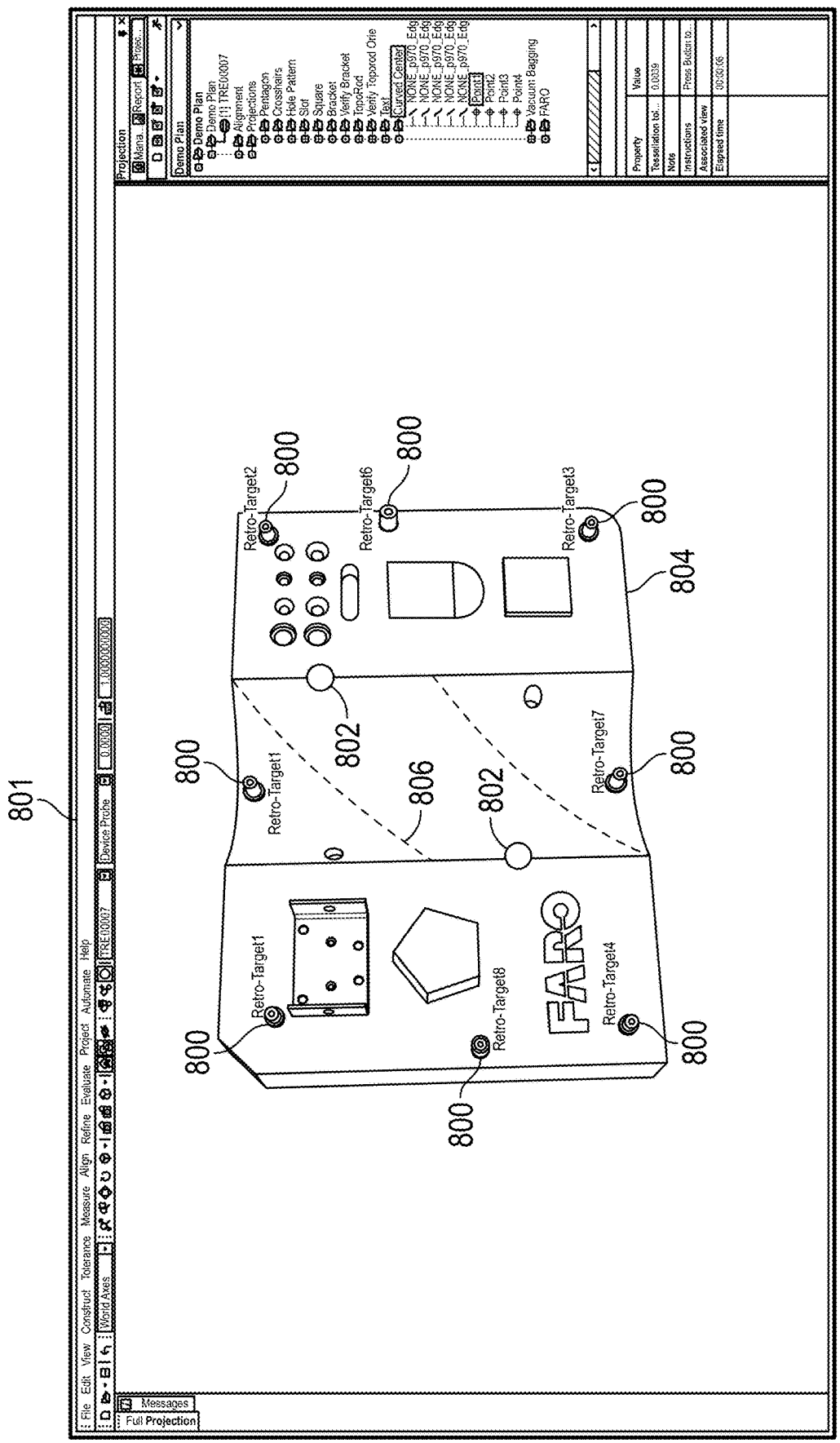
FIG. 8A is a view of a user interface for defining alignment, template, and inspection locations on an object according to an embodiment.

The method 700 begins in block 702 where the alignment points 800 and inspection points 802 are defined in a CAD model 804 (FIG. 8A). It should be appreciated that the number of alignment points 800 and inspection points 802 illustrated in FIG. 8A are not intended to be limiting. For example, there may be at least three alignment points 800 and at least one inspection point 802. The operator also defines a template 806, sometimes referred to as a contour, that represents the path or trajectory of the beam of light emitted from the light projector 10 onto the object or layout assembly. Where the beam of light strikes the surface, the rapid movement of the beam of light along the trajectory creates the appearance of a glowing pattern/template of light. The template 806 is in the same shape as the layer to be applied and provides a guide for the operator to place the layer. It should be appreciated that while only a single template is illustrated and described herein, the operator may define as many templates 806 as needed to define the layup of the object being fabricated.

Figure 8B:
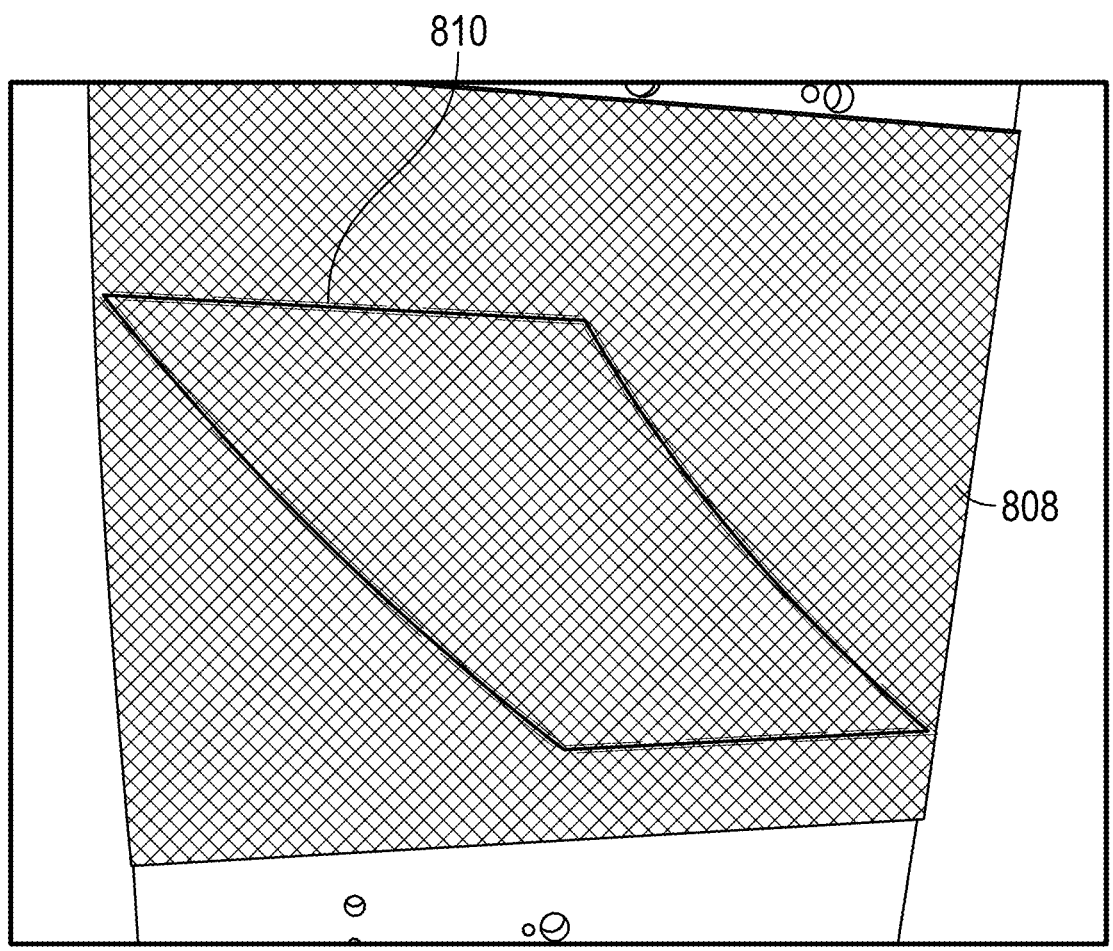
FIG. 8B is a view of an object with a template projected thereon according to an embodiment.

The method 700 then proceeds to block 704 where the light projector 10 is aligned with the object 808 (FIG. 8B), such as the fabrication tooling (e.g. the components represented by electronic-model/CAD model 804) used in the layup assembly. In an embodiment, arranged at each of the alignment points 800 is a target, such as retroreflective target for example. In an embodiment, the beam of light emitted by the light projector 10 is moved across the surface of the object 808, such as in a raster pattern for example. As the beam of light is moved across the retroreflective target, the intensity or the optical power of the reflected light will increase substantially relative to the surrounding surfaces. When the scan is completed, the light projector 10 may generate an image, sometimes referred to as an intensity image, of the object, with retroreflective targets being identified as bright spots on the object. The centers of each of these bright spots can be aligned (e.g. using a best-fit technique) with the alignment points 800 of the CAD model. In this way, the position of the light projector 10 may be determined with six-degrees of freedom.

Figure 8C:
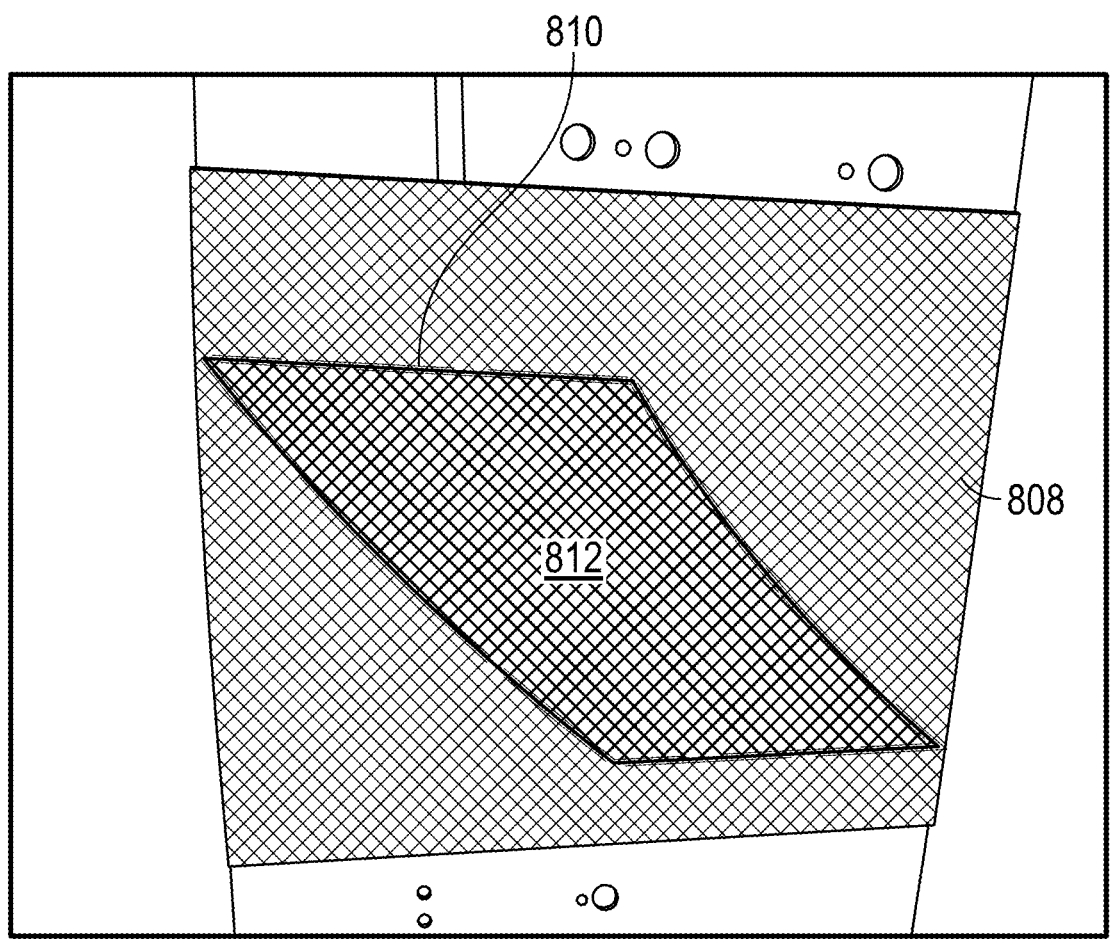
FIG. 8C is a view of the object with a layer positioned and aligned based on the projected template according to an embodiment.

With the light projector 10 aligned to the object 808, the method 700 proceed to block 706 wherein the template 810 is projected by the light projector 10 onto the object 808. As discussed above, the light projector 10 moves the beam of light rapidly along a path or trajectory 806 to create an illusion to the operators eye that a glowing light pattern is on the object surface. The method 700 then proceeds to block 708 where the operator applies or positions to ply layer 812 (FIG. 8C) to the layup assembly or object 808.

Figure 8D:
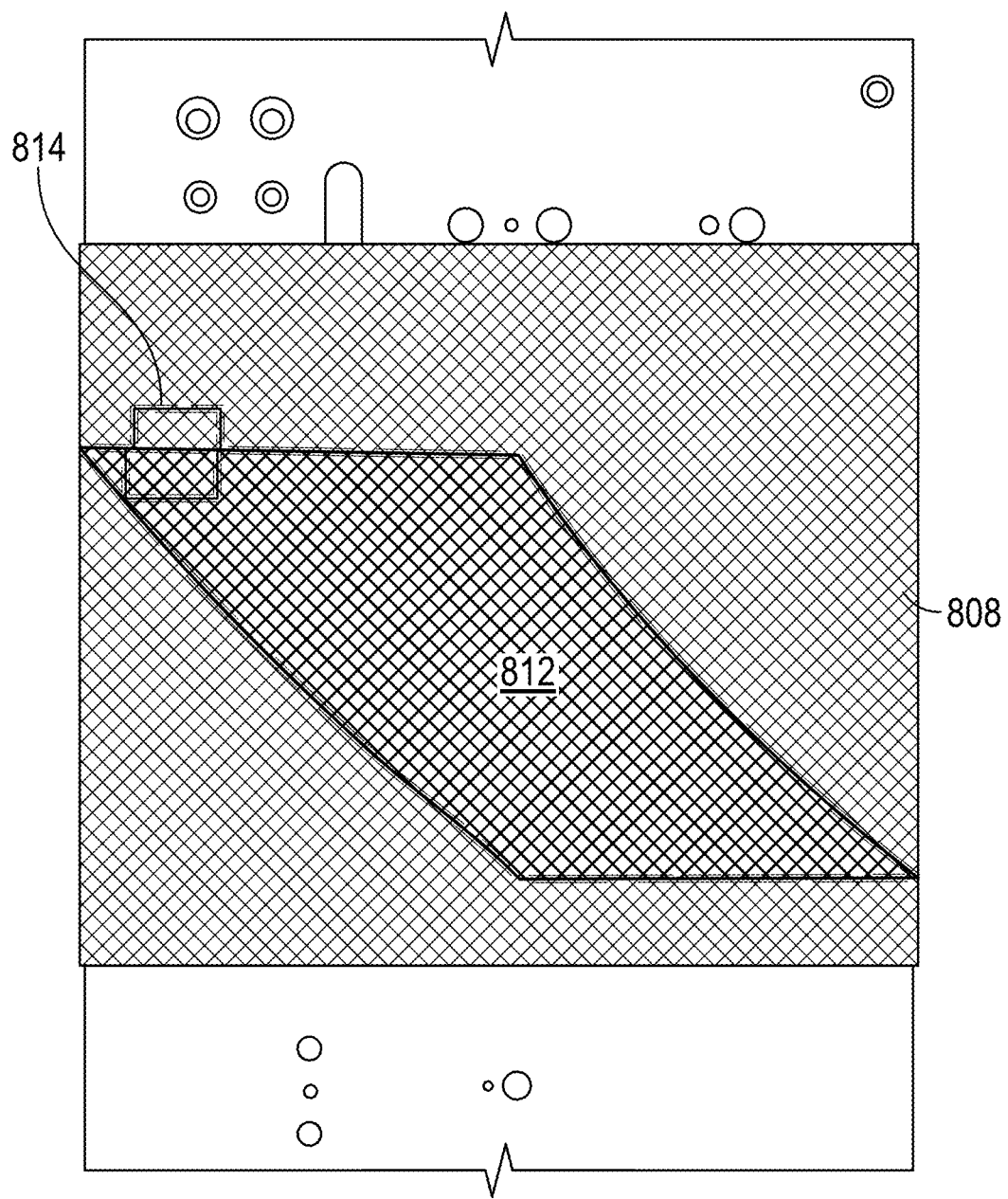
FIG. 8D is a view of the object with a scan box projected about an inspection location according to an embodiment.
Figure 8E:
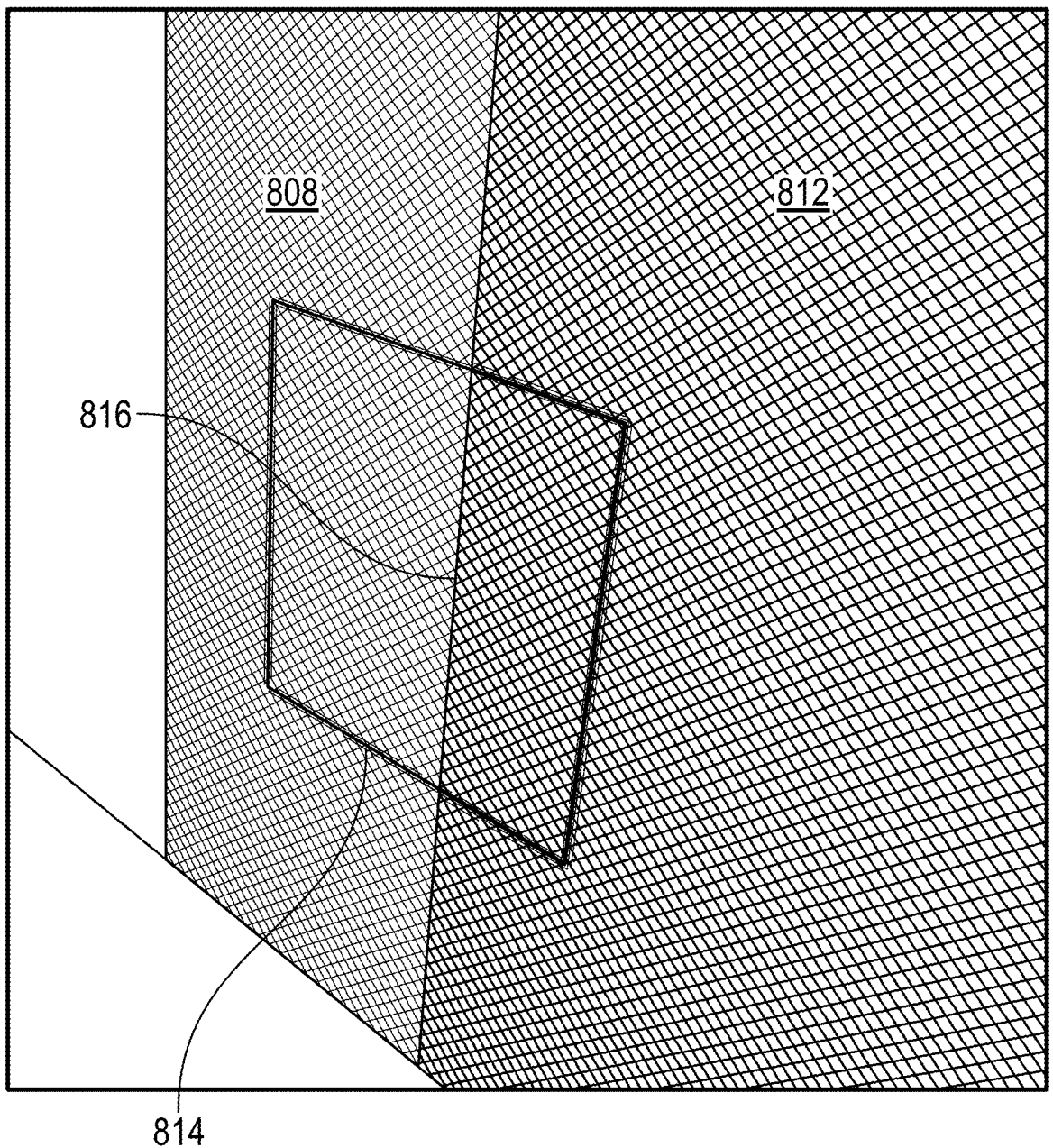
FIG. 8E is an enlarged view of the scan box of FIG. 8D according to an embodiment.

In some embodiments, it may be desired to have the position of the layer 812 verified before proceeding to place the next layer. In an embodiment, the method 700 then proceeds to block 710 where a scan box 814 (FIG. 8D, FIG. 8E) is projected onto the object surface. In an embodiment, a portion of the scan box 814 is positioned on the layer 812 and a second portion of the scan box 814 is on the object 808. The location of the scan box 814 is defined by the inspection points 802. In an embodiment, the scan box 814 has a predetermined size (e.g. 25 millimeters×25 millimeters), with the inspection point 802 centered within the scan box 814. It should be appreciated that while the illustrated embodiment shows the layer 812 as being a different color as the underlying layer or object 808, this is for clarity of illustration. In a typical layup application, adjacent layers may be of the same color. As a result, there is little contrast between the layer 812 and the object 808 (or the underlying layer). Due to the lack of contrast, it may be difficult for the light projector to measure the edge 816 of the layer 812 within the scan box 814.

Figure 8F:
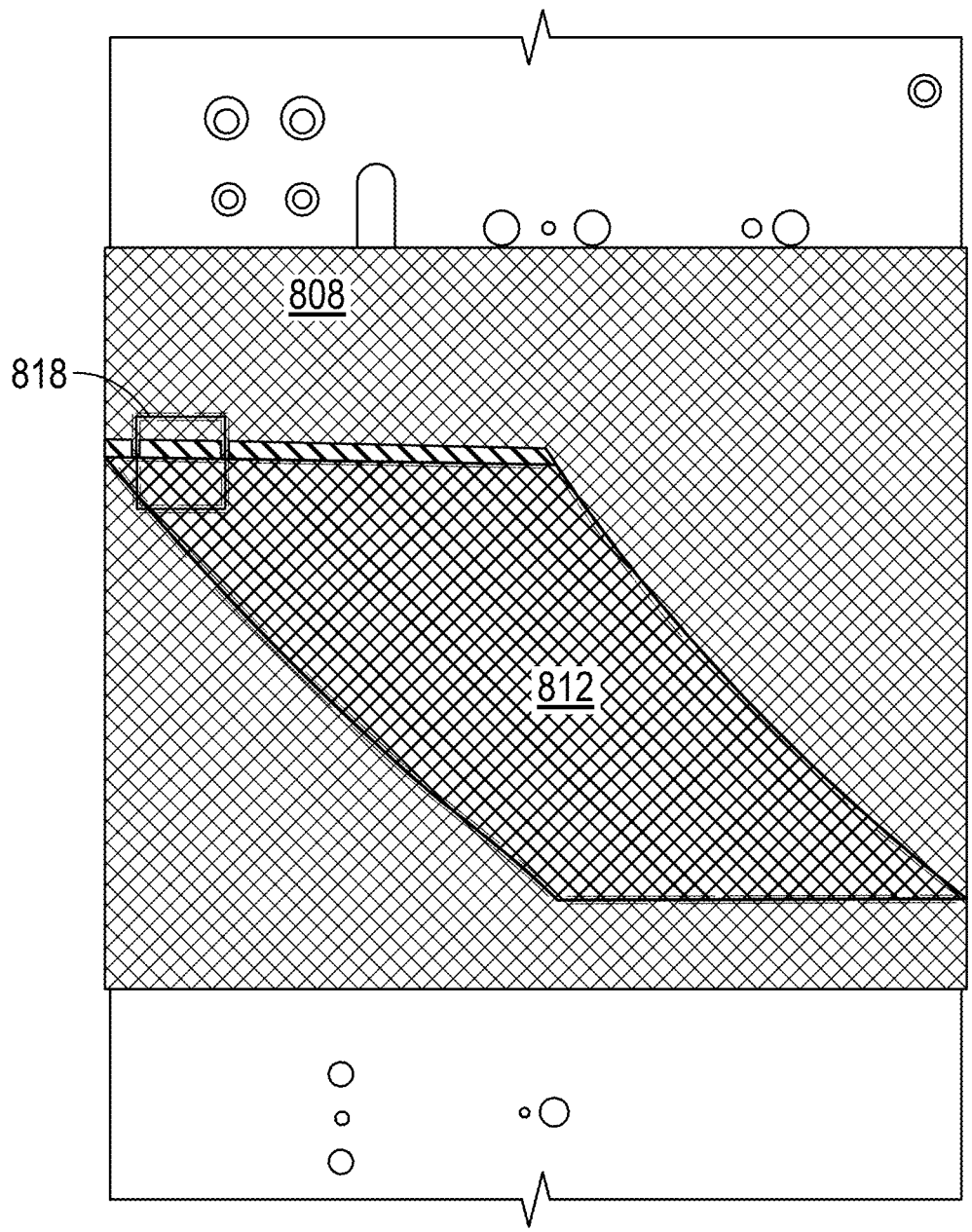
FIG. 8F is a view of the object with a retroreflective material applied to an edge of the layer according to an embodiment.
Figure 8G:
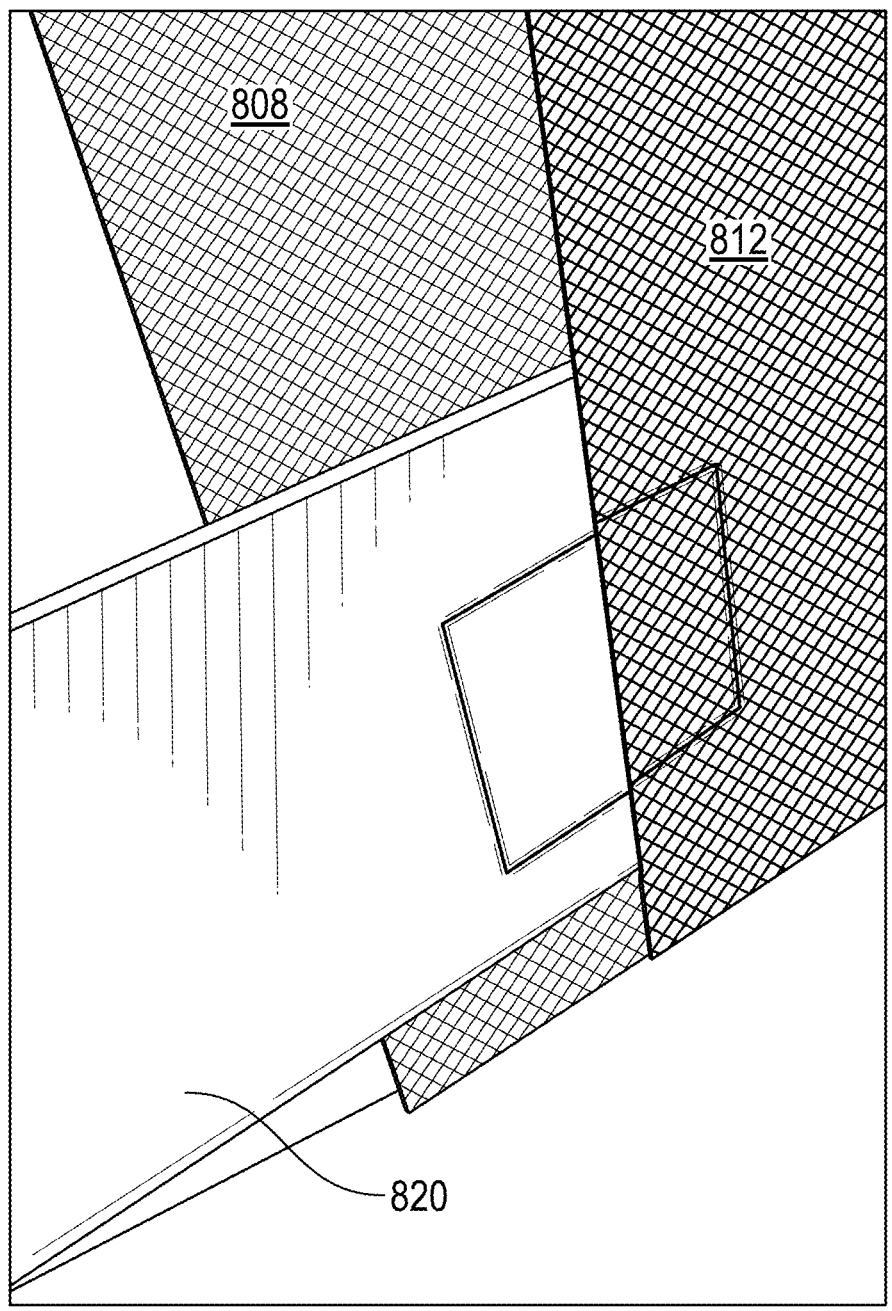
FIG. 8G is a view of the object with a retroreflective device placed against the edge of the layer according to another embodiment.

To improve the contrast, the method 700 proceeds to block 712 where a contrast element 818, 820 (FIG. 8F, FIG. 8G) is applied or placed on the object 808 or the layer 812 where the scan box 814 is located. In an embodiment, the contrast element 818, 820 has a reflective or retroreflective property that optically distinguishes or creates a visual delineation of the edge 816. In an embodiment, the contrast element is a retroreflective paint 818 that is applied to the edge 816 of the layer 812. In an embodiment, the retroreflective paint 818 may be Life Spray Reflective Safety Spray manufactured by LUX Innovative Supply of Quebec, Canada In an embodiment, the retroreflective paint 818 is applied by the same system that cuts the layer 812. In another embodiment, the contrast element is a retroreflective member or card 820. The card 820 is placed against the edge 816. In an embodiment, the card 820 has substantially the same thickness as the layer 812. In an embodiment, the thickness of the card 820 is not relevant because the deviation measurements are made in two-dimensions. In an embodiment, the card 820 may have a lanyard attached to make it more visible and reduce the risk that it will be left in the layup assembly.

With the contrast element in place, the method 700 proceeds to block 714 where the light projector 10 scans the area within the scan box 814 to measure the location of the edge 816. In an embodiment, the light projector 10 moves the beam of light in a predetermined pattern (e.g. a raster pattern) within the scan box 814. This allows the light projector 10 to determine the position of the edge feature within the scan box 814. The resolution of the scan is sufficient to determine the location of the edge 816 within a desired accuracy.

Figure 8H:
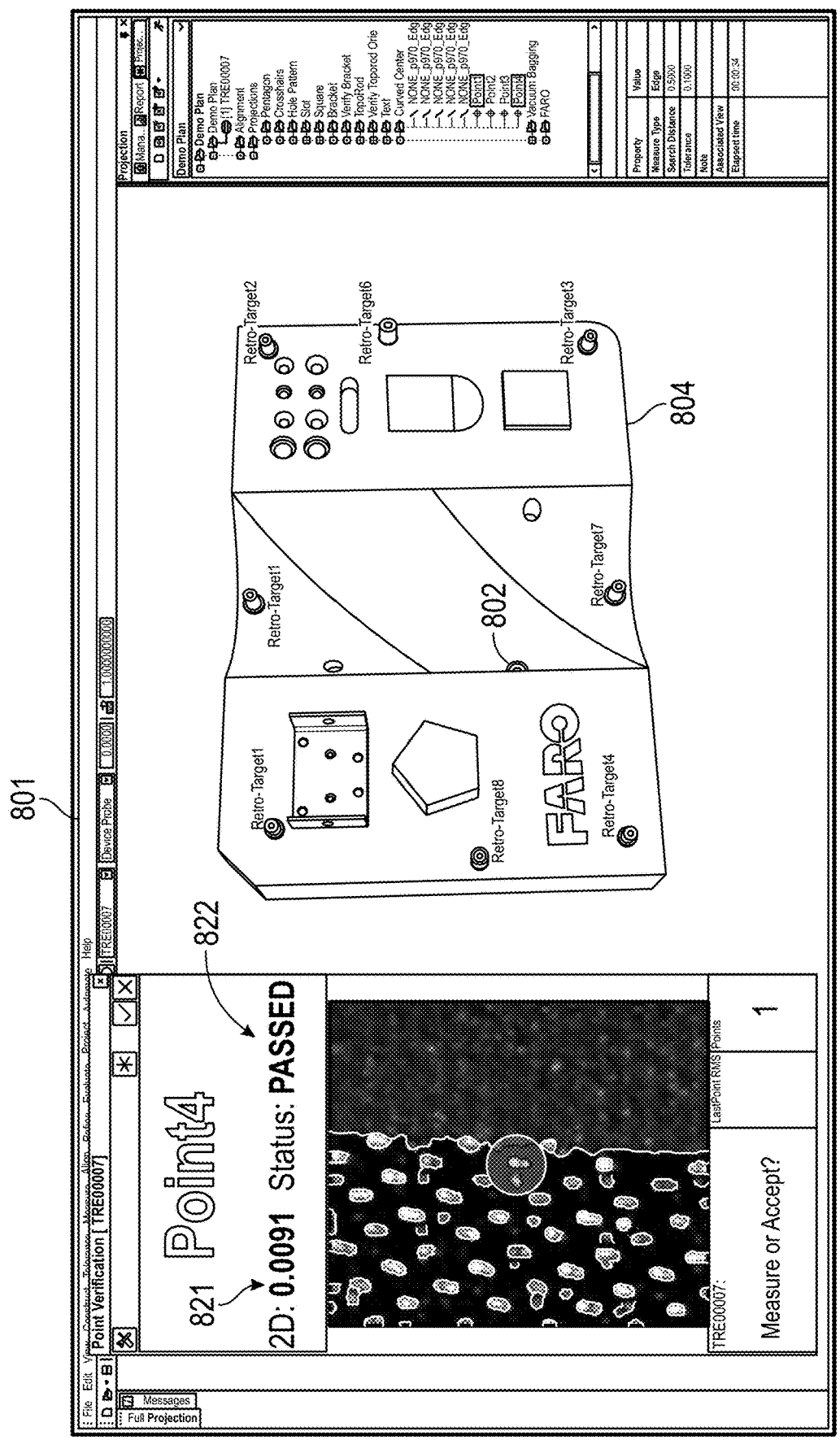
FIG. 8H is an illustration of a user interface displaying the results of the verification at a scan box location according to an embodiment.

The method 700 then proceeds to block 716 where a deviation is determined, such as by comparing the measured location of the edge 816 with an expected location (such as inspection points 802) based on an electronic-model/CAD model 804. In an embodiment, the user interface 801 provides an indication (FIG. 8H) to the operator the amount of the measured deviation 821 and an indication 822 whether the position/orientation of the layer 812 is within an acceptable range/tolerance.

The method 700 then proceeds to query block 718 where it is determined if there are any additional inspection points to be measured. When the query block 718 returns a positive, meaning there are additional inspection points to measure, the method 700 loops back to block 710 and the process continues. When the query block 718 returns a negative, meaning there are no additional inspection points, the method 700 terminates in block 720.

It should be appreciated that while the illustrated embodiments show and describe the contrast element 818, 820 as being a retroreflective paint or card, this is for example purposes and the claims should not be so limited. In other embodiments, other contrast elements may be used provided that the contrast element changes the optical/visual appearance of the edge 816 to allow the light projector 10 to measure and distinguish the edge of the layer from the underlying surface. In other embodiments, the contrast element may not be retroreflective but rather may be luminescent, glittery, or configured to reflect other wavelengths of light such as ultraviolet or infrared light for example. In other embodiments, the contrast element may be sprayed on, rolled on, rubbed on (e.g. a pen or marker), brushed on, or adhesively applied for example. In still other embodiments, the contrast element may be automatically applied or placed. In still further embodiments the contrast element may be a reflective/retroreflective label with an adhesive backing that is placed on the layer 812 or the object 808.

Figure 9A:
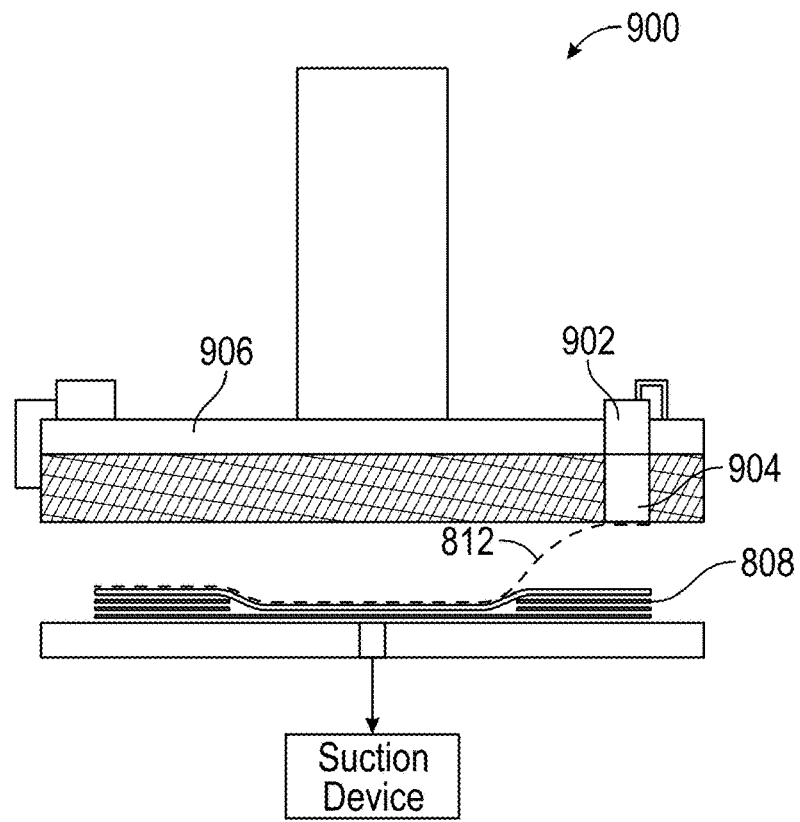
FIG. 9A is a schematic illustration of a system for applying layers to an object according to an embodiment.
Figure 9B:
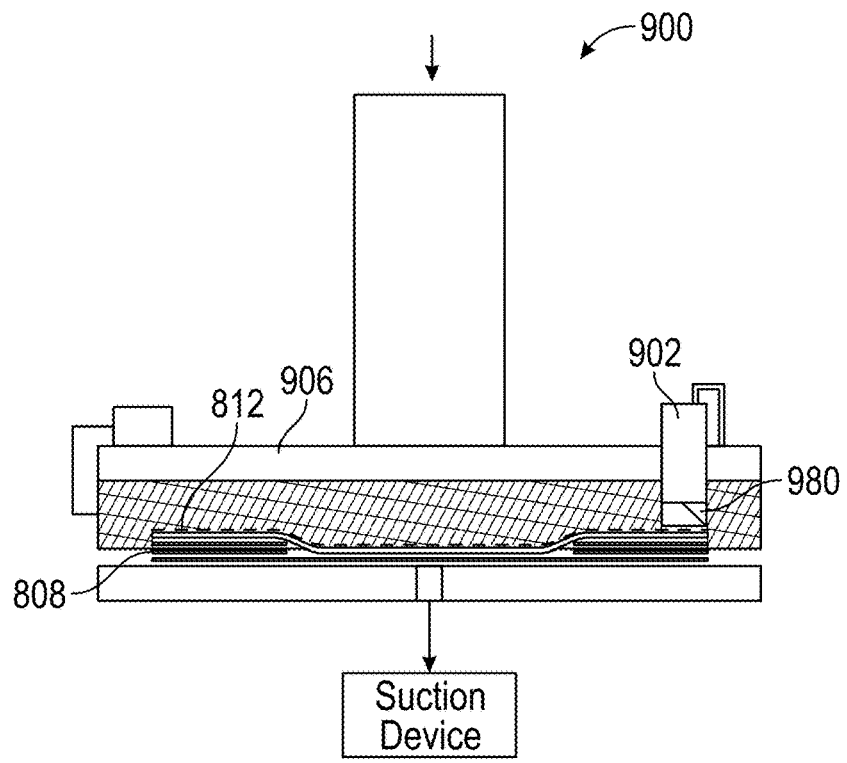
FIG. 9B is a schematic illustration of the system cutting an applied layer to a desired shape and size according to an embodiment.
Figure 9C:
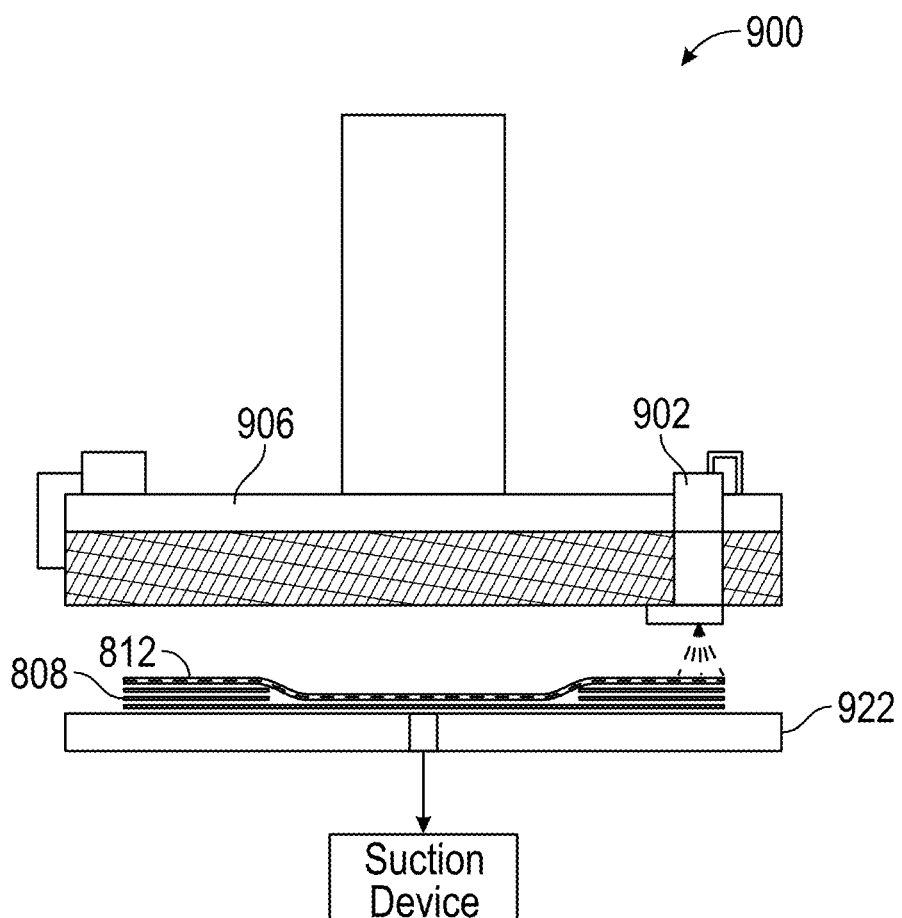
FIG. 9C is a schematic illustration of the system applying a retroreflective material to the applied layer according to an embodiment.

Referring now to FIG. 9A-9C, an embodiment is shown of a system 900 for automatically placing the layer 812 and the contrast element 818. In an embodiment, the system 900 includes a movable arm 902 that includes an end effector 904 that is configured to couple to and move the layer 812. In the illustrated embodiment, the arm 902 moves on a linear rail 906. The linear rail 906 movable in the vertical and horizontal (into and out of the page from the view of FIG. 9A) direction to allow placement of the layer 812. It should be appreciated that the system 900 may have other types of placement mechanisms, such as an articulated arm for example.

In an embodiment, once the layer 812 is placed, a cutting implement 908 is attached to the arm 902. It should be appreciated that the cutting implement 908 may be coupled to the arm in any known tool connection method. The cutting implement 908 may be removably coupled to the arm (e.g. via a tool changer) or may be integrated into the arm and movable from a retracted position to an operating position for example. The cutting implement 908 is configured to cut the layer 812 to the desired size and shape by moving the cutter across the layer 812.

Once the layer 812 is cut to shape, the system 900 proceeds to apply the contrast element to the layer 812 at the edge 816. In an embodiment a contrast element applicator 922 is coupled to the arm 902. The contrast element applicator 922 may be any device suitable for dispensing or applying the contrast element to the edge 816, such as but not limited to a spraying device, a marking pen, a roller, or a brush for example. The contrast element applicator 922 may be removably coupled to the arm 902, such as via a tool changer for example. In other embodiments, the contrast element applicator 922 may be integrated into the arm. The contrast element applicator 922 is moved along the edge 816 to dispense or apply the contrast element. In some embodiments, the cutting implement 908 may leave strands of fiber (approximately 1 millimeter thick) on the edge 816. The applying of the contrast element also provides advantages in making the strands visible to the operator so that corrective action (if any) may be taken. These strands or slivers may become what is referred to as foreign object debris (FOD), which is undesired in the final assembly. With the contrast element applied, the position of the ply can verified as described herein. In some embodiments, the verification system, such the light projector 10 is integrated into the system 900. In other embodiments, the verification may be perform outside of the system 900. The verification may be performed automatically or by an operator.

In an embodiment, after the cutting implement 908 has cut the layer 812, or after the layer 812 is placed on the object 808, the light projector 10 may be used to scan the surfaces of the layer 812 and/or object 808 to determine the presence of FOD, such as fiber strands from the cutting step, or articles that were inadvertently left on surfaces of the layer 812 and/or the object 808.

In an embodiment, the contrast element is applied as the layer 812 is being cut (e.g simultaneously). In another embodiment, the contrast element is applied prior to the cutting step.

It should be appreciated that while the illustrated embodiment shows the layer 812 being positioned by the system 900 onto an object 808 or a layup assembly, this is for example purposes and the claims should not be so limited. In other embodiments, the system 900 may cut the layer 812 to size and shape, and apply the contrast element. The layer 812 may then be removed (manually or automatically) and subsequently positioned on the object.

It should further be appreciated that while embodiments herein describe the detection of the edge with the contrast element using a light projector, this is for exemplary purposes and the claims should not be so limited. In other embodiments, other systems may be used that include optical sensors that are configured to receive light reflected from the object and layer. These optical sensors may be used in a photogrammetry type of device, or a single camera system using image analysis for example. The optical sensor may be part of a camera system having lens and other optical components as is known in the art for acquiring images of the object and/or layer.

The term "about" is intended to include the degree of error associated with measurement of the particular quantity based upon the equipment available at the time of filing the application.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should also be noted that the terms "first", "second", "third", "upper", "lower", and the like may be used herein to modify various elements. These modifiers do not imply a spatial, sequential, or hierarchical order to the modified elements unless specifically stated.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An apparatus for verifying a position of an edge of a component on an object, the apparatus comprising:
    an optical sensor configured to receive light reflected from the component and the object;
    a contrast element disposed on the edge, wherein the contrast element is a retroreflective paint applied to the edge; and
    one or more processors operably coupled to the optical sensor, the one or more processors;
    determining the position of the edge at an inspection point;
    determining a deviation in the position of the edge and a predetermined position of the edge; and
    providing an indication of an amount of the deviation and an indication whether the position or orientation of the object is within an acceptable range or tolerance.

2. The apparatus of claim 1, further comprising a light projector having a light source operable to emit a beam of outgoing light and a beam steering system operable to steer the beam of outgoing light onto the component and the object, wherein the light received by the optical sensor is light from the beam of outgoing light returned from the component and the object.

3. The apparatus of claim 2, wherein the optical sensor is integrated into the light projector.

4. The apparatus of claim 1, wherein the deviation is based on comparing the determined position to an electronic model.

5. The apparatus of claim 1, wherein the one or more processors are further responsive for projecting a template of light onto the object prior to placement of the component.

6. The apparatus of claim 1, wherein the component is a layer of material and the object is a layup assembly.

7. The apparatus of claim 1, wherein the one or more processors are further responsive to detect the presence of foreign object debris on the object or the component.

8. The apparatus of claim 7, wherein the detection of the foreign object debris is based at least in part on an image acquired by the optical sensor.

9. The apparatus of claim 3, wherein the one or more processors are further responsive to detect the presence of foreign object debris on the object or the component based at least in part on the beam of outgoing light returned from the component and the object.

10. A method of verifying a position of a component on an object, the method comprising:
    disposing a contrast element on an edge of the component of the object, wherein the contrast element is a retroreflective paint applied to the edge, wherein the object is a layup assembly and wherein the component is a ply of the layup assembly;

receiving a returned light with an optical sensor;
determining a position of the edge based at least in part on the returned light
determining a deviation in the position of the edge and a predetermined position of the edge; and
providing an indication of an amount of the deviation and an indication whether the position or orientation of the object is within an acceptable range or tolerance.

11. The method of claim 10, further comprising:
generating a template of light on the object with a light projector;
positioning the component on the object based at least in part on the template of light;
emitting a beam of outgoing light with a light source of the light projector; and
steering the beam of outgoing light onto the object with a beam steering system to define a scan box.

12. The method of claim 11, wherein the scan box is positioned on the edge, and the returned light is the beam of outgoing light reflected by the object or the component.

13. The method of claim 10, wherein the predetermined position is based at least in part on an electronic model of the object and the component.

14. The method of claim 10, wherein the disposing of the contrast element includes applying the retroreflective paint on the edge of the component.

15. The method of claim 14, wherein the applying of the reflective material includes spraying, rolling, brushing, or rubbing of the reflective material onto the edge.

16. The method of claim 10 detecting the presence of foreign object debris on the object or the component.

17. The method of claim 16, wherein the detection of the foreign object debris is based at least in part on an image acquired by the optical sensor.

18. The method of claim 12, further comprising detecting the presence of foreign object debris on the object or the component based at least in part on the returned light.

* * * * *